United States Patent
Sampey et al.

(10) Patent No.: US 11,288,697 B1
(45) Date of Patent: Mar. 29, 2022

(54) SYSTEMS AND METHODS FOR POINT-OF-SALE-BASED OFFER REDEMPTION

(71) Applicant: SKUxchange, LLC, St. Petersburg, FL (US)

(72) Inventors: James Sampey, Indian Rocks Beach, FL (US); Bobby Tinsley, Palmetto, FL (US); Robert Zaccardo, St. Petersburg, FL (US); Kenneth Douglas, St. Petersburg, FL (US); Moshe Joshua, Woodmere, FL (US)

(73) Assignee: SkuXchange, LLC, St. Petersburg, FL (US)

(*) Notice: Subject to any disclaimer, the term of this patent is extended or adjusted under 35 U.S.C. 154(b) by 0 days.

(21) Appl. No.: 17/078,227

(22) Filed: Oct. 23, 2020

(51) Int. Cl.
| | | |
|---|---|---|
| *G06Q 30/00* | (2012.01) | |
| *G06Q 30/02* | (2012.01) | |
| *H04L 9/06* | (2006.01) | |
| *G06Q 20/34* | (2012.01) | |
| *G06Q 20/38* | (2012.01) | |

(52) U.S. Cl.
CPC ....... *G06Q 30/0238* (2013.01); *G06Q 20/348* (2013.01); *G06Q 20/387* (2013.01); *G06Q 30/0225* (2013.01); *H04L 9/0618* (2013.01)

(58) Field of Classification Search
None
See application file for complete search history.

(56) References Cited

U.S. PATENT DOCUMENTS

| | | | | |
|---|---|---|---|---|
| 9,258,296 | B2* | 2/2016 | Juthani | H04L 63/083 |
| 2011/0191160 | A1* | 8/2011 | Blackhurst | G06Q 20/20 |
| | | | | 705/14.38 |
| 2012/0095822 | A1* | 4/2012 | Chiocchi | G06Q 30/0207 |
| | | | | 705/14.26 |
| 2013/0282462 | A1* | 10/2013 | Xu | G06Q 30/0251 |
| | | | | 705/14.26 |

(Continued)

OTHER PUBLICATIONS

Sengel, Oznur, et al. "A Survey on White Box Cryptography Model for Mobile Payment Systems." International Communications Conference, Jul. 6, 2018. (Year: 2018).*

(Continued)

*Primary Examiner* — Luis A Brown
(74) *Attorney, Agent, or Firm* — Michael F. Krieger; Kirton McConkie

(57) ABSTRACT

Systems and methods for issuance of individualized promotional offers that can only be redeemed for purchase of specified items are disclosed. The promotional offers are only valid when they are used to purchase certain items. If an attempt to use the promotional offer is made and an authorized product is not part of the purchase transaction, the promotional offer will not be useable. Instead, the operator of the point-of-sale device that receives the promotional offer will not be able to validate the promotional offer. The validation of the promotional offer (when a correct item is part of the purchase) or lack thereof (when a correct item is not part of the purchase) occurs entirely at the point of sale, without requiring a point-of-sale device to communicate externally with any systems or devices to receive instructions relating to which products are authorized for use with the promotional offers.

10 Claims, 6 Drawing Sheets

(56) References Cited

U.S. PATENT DOCUMENTS

| | | | |
|---|---|---|---|
| 2013/0282589 A1* | 10/2013 | Shoup | H04L 63/08 |
| | | | 705/67 |
| 2014/0249903 A1* | 9/2014 | Preston | G06Q 20/387 |
| | | | 705/14.22 |
| 2015/0112790 A1* | 4/2015 | Wolinsky | G06Q 30/0238 |
| | | | 705/14.38 |
| 2016/0012465 A1* | 1/2016 | Sharp | G06Q 20/386 |
| | | | 705/14.17 |
| 2019/0164166 A1* | 5/2019 | Kinch | G06Q 20/3823 |
| 2019/0166118 A1* | 5/2019 | Lee | H04L 63/102 |
| 2020/0027112 A1* | 1/2020 | Sogawa | G06Q 20/385 |
| 2021/0004804 A1* | 1/2021 | Sampey | G06Q 20/045 |
| 2021/0004860 A1* | 1/2021 | Sampey | G06Q 20/204 |

OTHER PUBLICATIONS

Cheng, Fred. "Security Attack Safe Mobile and Cloud-based One-Time Password Tokens Using Rubbing Encryption Algorithm." Mobile Network Applications, vol. 16, pp. 304-336, Apr. 12, 2011. (Year: 2011).*

\* cited by examiner

SYSTEMS AND METHODS FOR POINT-OF-SALE-BASED OFFER REDEMPTION

CROSS-REFERENCE TO RELATED APPLICATIONS

This application is related to prior application Ser. No. 16/503,994, filed Jul. 5, 2019, prior application Ser. No. 16/503,999, filed Jul. 5, 2019, prior application Ser. No. 16/784,018, filed Feb. 6, 2020, prior application Ser. No. 16/815,870, filed Mar. 11, 2020, and prior application Ser. No. 16/921,057, filed Jul. 6, 2020 (the "prior Applications"), all of which are incorporated herein by reference for all they disclose.

BACKGROUND OF THE INVENTION

1. Field of the Invention

The present invention relates to the promotional offer industry, and more particularly to systems and methods for facilitating point-of-sale-based promotional offer redemption that is specific to purchase of certain items.

2. Background and Related Art

In the promotional offer industry, including, without limitation, gift card programs, coupon programs, loyalty programs, and real-time payment programs, there are currently limits and difficulties imposed on participants in the promotional offer industry. For example, using traditional methods, a manufacturer that wishes to issue (e.g., typically through a vendor, marketing agent, etc.) coupons for its products has little or no control over coupon redemption and payment or effects of the couponing program until later (whether thirty days, sixty days, or six months later), when the manufacturer discovers how well the coupon program worked. Accordingly, in the promotional offer industry, there are currently limited protections against fraud and accordingly a limited return on investment by participants in the promotional offer industry. At the same time, there is a significant risk of fraud in generation of fraudulent coupons, fraudulent reporting of redemption, and the like.

Even the reward issuer (e.g., the vendor, marketing agent, etc.) typically has little or no control over coupon or offer redemption and payment and little knowledge of the course of redemption. At the same time, there is a significant risk of fraud in generation of fraudulent coupons, fraudulent reporting of redemption, and the like. Such problems are exacerbated by the convoluted redemption and settlement process. Accordingly, coupon issuers in the promotional offer industry, individually and jointly, traditionally have little knowledge or control over how their promotional coupons are used or if they are effective.

A significant problem inherent in the promotional offer industry is the convoluted redemption (reconciliation and settlement) process. It is typical for redeemed coupons to be collected at the point of sale then shipped out of country to a location where inexpensive labor can be sourced for coupon counting. Coupon counting is typically done by hand in such locations, though in some instances, coupons are not actually counted, but the number of coupons redeemed is estimated based solely on weight. It is not uncommon for a certain amount of fraud in the process to simply be assumed, whereby retailers where coupons were redeemed do not receive the full value of collected and redeemed coupons, but instead receive some percentage thereof, such as 80%, whether or not the retailer participated in any fraudulent activity relating to redemptions of the promotional offer. Accordingly, under current promotional offer redemption practices, the existence of fraud harms all participants of the promotional offer process.

Furthermore, the manual nature of the current redemption, reconciliation, and settlement process means that often a significant amount of time passes between the coupon issuance, redemption, reconciliation, and settlement. This process ties up funds for all parties involved. In particular, manufacturers or other promoters cannot be sure of the total outlay associated with a promotional offer until sometimes many months after expiration of coupons or other promotional offers issued as part of a promotional offer campaign. The best that can be done is to extrapolate from past promotional offer campaigns of the manufacturer or of similarly situated manufacturers and to hope for the best. If a redemption rate exceeds expectations, the manufacturer may find itself liable to retailers who accepted the coupons or other promotional offers to an extent not anticipated. Accordingly, manufacturers and other promoters are harmed by the delay inherent in the traditional promotional offer environment.

Retailers and other merchants that accept coupons and other promotional offers are also similarly harmed. Retailers are expected to accept less than full value for goods or services at the time of sale and to then be reimbursed at a later time. Unfortunately, because of the delay inherent in traditional reconciliation and settlement processes, retailers may have to wait as much as several months to be reimbursed while manual verification of coupons occurs, often out of the country. Furthermore, because of fraud and estimation difficulties inherent in traditional promotional offer redemption, retailers and other merchants often only receive back a percentage of total coupons or offers accepted, such as 80%. Accordingly, these difficulties cause significant problems for retailers. As a result, some retailers have gone to the extreme of refusing to accept coupons and promotions rather than deal with the problems inherent to the reconciliation and settlement processes.

Still further problems are inherent in the reconciliation and settlement process. While much of the reconciliation process, such as counting of received coupons, occurs in other countries to take advantage of lower labor costs involved in manual counting, there are still significant costs involved in transporting coupons, and paying for manual counting. Other significant costs include auditing costs associated with preventing fraud on the part of the count provider or other entities involved in the promotional offer process. Accordingly, not only is the current reconciliation and settlement process wasteful in terms of time, but it involves significant costs with little beneficial return.

Increasingly, brands (e.g., manufacturers, retailers, etc.) wish to utilize promotions in managing their relationships with their customers. Brands wish to use coupons as a tool for addressing issues relating to customer recovery (in the event of customer dissatisfaction) or to increase customer loyalty and engagement. Unfortunately, traditional promotions such as coupons or coupon codes have been of limited use in such efforts. Traditional coupons or coupon codes that would be issued by brands are subject to the same limitations as other offers in the promotional offer industry. Some coupons or promotions are available for use anywhere, but such coupons or promotions are subject to the same difficulties in redemption, tracking, unauthorized duplication, and the like, and brands using such coupons or promotions have little ability to determine the extent to which such efforts result in customer recovery or rehabilitation or other brand-related customer loyalty.

Brands have at times issued coupons or coupon codes to customers that are location-specific, such as codes that can be used at the brand's own website or store. While such coupons or coupon codes can be individually coded and tracked to a greater extent than some other promotional offers or efforts, they are limited in their ability to affect customer loyalty, recovery, rehabilitation, etc. In particular, disgruntled customers often do not wish to be limited to use of a coupon code at a particular site or store, where products are at times priced higher than they can be obtained without a coupon code or promotion somewhere else.

Additionally, the ability of brand-issued coupons or coupon codes to be limited to use with certain specific items has traditionally been limited and have entailed difficulties in redemption. This is especially true with respect to coupons or coupon codes issued on a limited basis with respect to customer rehabilitation and retention after a bad customer experience. Such coupons or coupon codes are often limited in number and thus may not typically be entered into all systems of locations where the coupons or coupon codes could typically be used. This presents a difficulty for retailers to use the coupons or coupon codes, either requiring that retailers enter codes in their systems that may never be used, or requiring that retailers manually input coupons at the time and point of sale, resulting in unwanted delays for the retailer and customers. In either instance, limiting use of coupons or coupon codes to particular items, especially single-use customized codes can be particularly difficult. As a result, the customer experience is not enhanced.

Brands that might seek to use coupons, coupon codes, or other promotional offers as part of their customer relationship management processes generally wish to minimize any inconvenience to the affected customers. In many instances, customers receiving promotional offers are already disgruntled, and any further inconvenience acts as a limitation on the goodwill that could potentially accrue to the effort to redeem the relationship between the customer and the brand. Accordingly, brands wish to make the process for redeeming promotional offers such as coupons, gift cards, coupon codes, and the like, as straightforward as possible.

Additionally, brands wishing to issue promotional offers, including coupons, coupon codes, gift cards, and the like as part of their customer relationship management process need to have the process be as simple as possible while also providing for features such as accountability, awareness of effect on customer relationship, redemption, and the like. Many traditional processes do not provide for any or all of these features. In particular, traditional paper coupons that could be issued by customer service agents lack tracking and accountability measures and are therefore subject to internal as well as external abuse. Similar problems are inherent in the gift card industry and the use of gift cards as promotional offers in customer relationship management.

In some instances, brands or other entities wishing to issue a promotion may find it convenient to offer the promotion as a bank card or gift card (which may collectively be referred to interchangeably). Unfortunately, there are traditionally few to no limits applicable to the use of such cards as promotions. The issuer of the promotion may wish to limit use of the cards toward purchase of certain items (thereby minimizing the cost of the promotion to the issuer or manufacturer or maximizing the profit to the manufacturer or issuer as promotions are used as intended), but there is currently little way for card issuers to ensure that the cards are used for any intended purpose. Instead, once such a card is issued, the recipient is able to use the monetary value of the gift card for any desired purpose, and often (in the case of non-store-specific cards) through any desired retailer or location. The card value is applied to the total amount of the receipt, regardless of what product or products are purchased, and the card is not tied to any specific item or product purchased.

In the prior Applications, systems and methods were disclosed that addressed many of these problems. Unfortunately, significant problems remain inherent in the promotional offer issuance and redemption process that were not fully addressed by the disclosed systems and methods. In particular, it would be advantageous to provide systems and methods that provide limiting of offer redemption to only certain products or items purchased at the point of purchase in a way that permits the retailer to verify the offer without requiring communications between the retailer and one or more other parties, such as the promotional offer issuer.

BRIEF SUMMARY OF THE INVENTION

Implementation of the invention provides systems and methods that address needs in the promotional offer issuance and redemption industry. In particular, implementation of the current invention provides systems and methods for issuance of individualized promotional offers that can only be redeemed for purchase of specified items. Systems and methods of certain implementations are implemented using non-transitory computer-readable media and using computing systems, including point-of-sale (POS) devices.

The promotional offers are only valid when they are used to purchase certain items. If an attempt to use the promotional offer is made and an authorized product is not part of the purchase transaction, the promotional offer will not be useable. Instead, the operator of the POS device that receives the promotional offer will not be able to validate the promotional offer. The validation of the promotional offer (when a correct item is part of the purchase) or lack thereof (when a correct item is not part of the purchase) occurs entirely at the POS, without requiring a POS device to communicate externally with any systems or devices to receive instructions relating to which products are authorized for use with the promotional offers.

In accordance with certain implementations of the invention, a method for issuing a promotional offer that is only redeemable for a specific item includes steps of associating a one-time-use unique bank card number with a promotional offer, encrypting the one-time-use unique bank card number with an encryption process to create a ciphertext promotional offer code, wherein the promotional offer code can only be decrypted back to the one-time-use unique bank card number using information identifying a product for which use of the promotional offer is authorized, and issuing the ciphertext promotional offer code as part of a promotion.

In some implementations, the method further includes steps of creating a decryption algorithm configured to receive as input the ciphertext promotional offer code and the information identifying the product for which use of the promotional offer is authorized. If and only if the ciphertext promotional offer code and the information identifying the product for which use of the promotional offer is authorized are provided to the decryption algorithm as inputs, the decryption algorithm will output the one-time-use unique bank card number as an output. The decryption algorithm is provided to a POS device at a POS.

In some implementations, the information identifying the product for which use of the promotional offer is authorized is information such as a stock keeping unit (SKU), a global trade item number (GTIN), a universal product code (UPC), an international article number (ARN), or an Australian product number (APN).

In some implementations, the POS device is configured to receive information identifying one or more items being purchased in a purchase transaction, receive the ciphertext promotional offer code as at least partial payment for the purchase transaction, and attempt to decrypt the ciphertext promotional offer code using the decryption algorithm and the information identifying the one or more items being purchased. The attempt to decrypt the ciphertext promotional offer code includes steps of, for each item of the one or more items being purchased and until the earlier of decryption of the one-time-use unique bank card number and when all of the information identifying the one or more items being purchased has been tried using the decryption algorithm, providing the ciphertext promotional offer code and information identifying one of the one or more items being purchased as inputs to the decryption algorithm and determining whether any output of the decryption algorithm is the one-time-use unique bank card number.

In some implementations, the step of determining whether any output of the decryption algorithm is the one-time-use unique bank card number uses a process such as for each output of the decryption algorithm, determining whether such output begins with a valid bank identification number (BIN) accepted by a merchant operating the POS device, for each output of the decryption algorithm, determining whether such output operates as a valid bank card number in a bank card processing system, or for each output of the decryption algorithm, determining whether such output operates as a valid bank card number according to a checksum performed using the Luhn algorithm. In some implementations, the POS device is configured to attempt to process through a bank card processing system at least partial payment for any output of the decryption algorithm that is determined to operate as a valid bank card number.

In some implementations, the POS device is configured to attempt to decrypt the ciphertext promotional offer code using the decryption algorithm and the information identifying the one or more items being purchased using either serial processing of the information identifying each of the one or more items being purchased or parallel processing of the information identifying at least two of the one or more items being purchased.

In some implementations, the POS device is configured to utilize a bank card authorization process to attempt to authorize the one-time-use unique bank card number as at least partial payment for the one or more items being purchased. In some implementations, different encryption processes are used to generate ciphertext promotional offer codes intended for redemption at different retailers, and different decryption algorithms are issued to each individual retailer. Thus a ciphertext promotional offer that would be valid at one retailer POS device may not be valid at a POS device of another retailer.

In some implementations, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code.

According to further implementations of the invention, a method for POS-based item-specific redemption of a promotional offer includes a step of providing a POS device including one or more input mechanisms adapted to receive information identifying one or more items being purchased in a purchase transaction and a ciphertext promotional offer code as at least partial payment for the purchase transaction. The method further includes steps of receiving, using one of the one or more input mechanisms of the POS device, the information identifying the one or more items being purchased in the purchase transaction and receiving, using one of the one or more input mechanisms of the POS device, the ciphertext promotional offer code as at least partial payment for the purchase transaction. The method also includes a step of utilizing a processor operatively connected to the POS device to operate a decryption algorithm that receives as inputs the ciphertext promotional offer code and the information identifying the one or more items being purchased in the purchase transaction. If and only if one piece of the information identifying the one or more items being purchased identifies a product for which use of the ciphertext promotional offer is authorized, when the ciphertext promotional offer code and the piece of the information identifying the product for which use of the ciphertext promotional offer is authorized are provided to the decryption algorithm as inputs, the decryption algorithm outputs a valid one-time-use unique bank card number as an output to the POS device.

In some implementations, the one or more input mechanisms include one or more mechanisms such as a keyboard, a touchscreen, an optical scanner, a microphone, a camera, or a wireless communication device. In some implementations, the input mechanism used for receiving the information identifying the one or more items being purchased and the input mechanism used for receiving the ciphertext promotional offer code are the same. In some implementations, the input mechanism used for receiving the information identifying the one or more items being purchased and the input mechanism used for receiving the ciphertext promotional offer code are different input devices.

In some implementations, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code. In some implementations, the piece of information identifying the product for which use of the ciphertext promotional offer is authorized includes information such as a SKU, a GTIN, a UPC, an ARN or an APN.

In some implementations, the POS device is configured to attempt to decrypt the ciphertext promotional offer code using the decryption algorithm and the information identifying the one or more items being purchased. The attempt includes steps of, for each item of the one or more items being purchased and until the earlier of decryption of the valid one-time-use unique bank card number and when all of the information identifying the one or more items being purchased has been tried using the decryption algorithm, providing the ciphertext promotional offer code and information identifying one of the one or more items being purchased as inputs to the decryption algorithm and determining whether any output of the decryption algorithm is the valid one-time-use unique bank card number.

In some implementations, the step of determining whether any output of the decryption algorithm is the valid one-time-use unique bank card number includes a process such as for each output of the decryption algorithm, determining whether such output begins with a valid bank identification number (BIN) accepted by a merchant operating the POS device, for each output of the decryption algorithm, determining whether such output operates as a valid bank card number in a bank card processing system, or for each output of the decryption algorithm, determining whether such output operates as a valid bank card number according to a checksum performed using the Luhn algorithm. In some implementations, the POS device is configured to attempt to process through a bank card processing system at least partial payment for any output of the decryption algorithm that is determined to operate as a valid bank card number.

In some implementations, the POS device is configured to attempt to decrypt the ciphertext promotional offer code using the decryption algorithm and the information identifying the one or more items being purchased using a method such as serial processing of the information identifying each of the one or more items being purchased or parallel processing of the information identifying at least two of the one or more items being purchased. In some implementations, the POS device is configured to utilize a bank card authorization process to attempt to authorize the one-time-use unique bank card number as at least partial payment for the one or more items being purchased.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
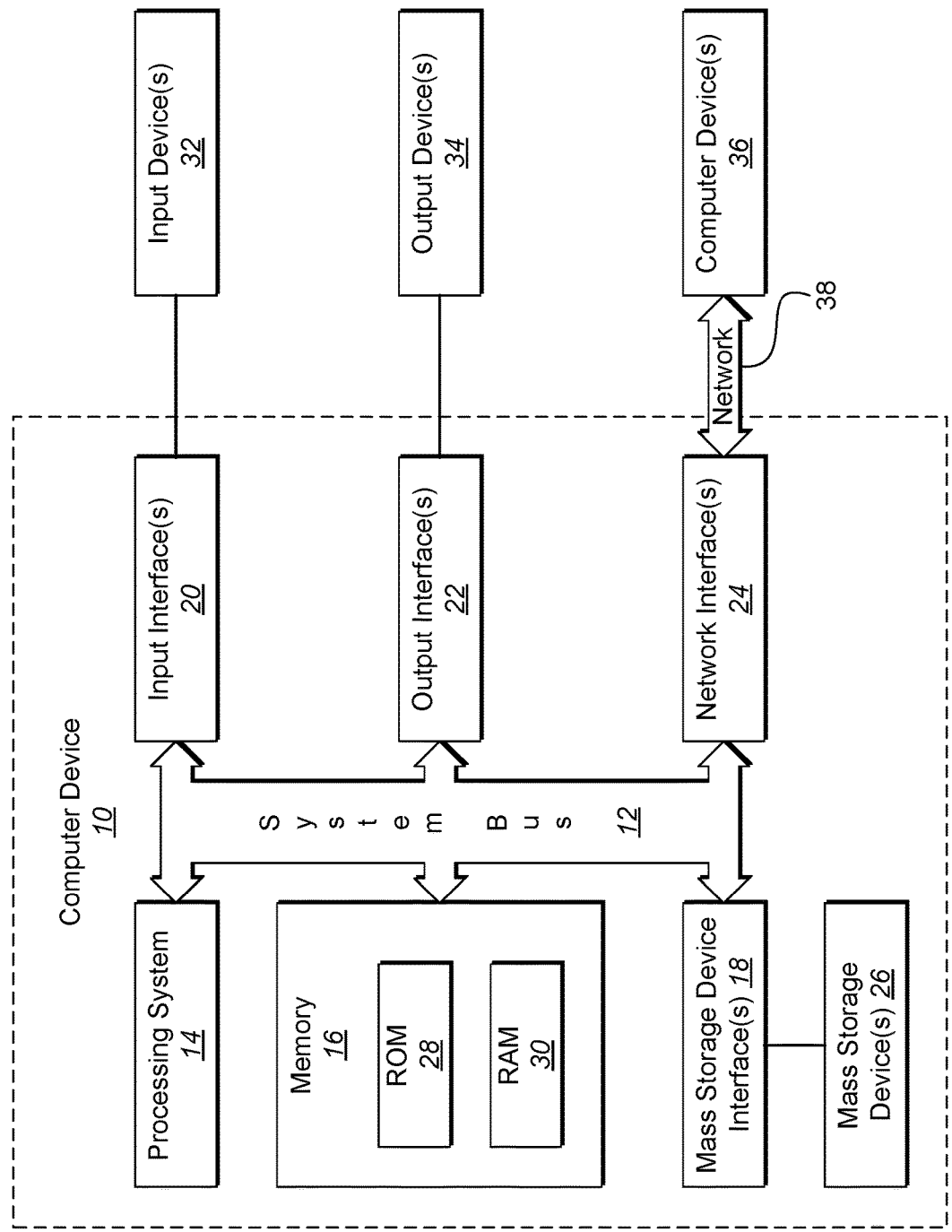
FIG. 1 shows a representative computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods that address needs in the promotional offer issuance and redemption industry. In particular, embodiments of the current invention provide systems and methods for issuance of individualized promotional offers that can only be redeemed for purchase of specified items. Systems and methods of certain embodiments are implemented using non-transitory computer-readable media and using computing systems, including point-of-sale (POS) devices.

The promotional offers are only valid when they are used to purchase certain items. If an attempt to use the promotional offer is made and an authorized product is not part of the purchase transaction, the promotional offer will not be useable. Instead, the operator of the POS device that receives the promotional offer will not be able to validate the promotional offer. The validation of the promotional offer (when a correct item is part of the purchase) or lack thereof (when a correct item is not part of the purchase) occurs entirely at the POS, without requiring a POS device to communicate externally with any systems or devices to receive instructions relating to which products are authorized for use with the promotional offers.

In accordance with certain embodiments of the invention, a method for issuing a promotional offer that is only redeemable for a specific item includes steps of associating a one-time-use unique bank card number with a promotional offer, encrypting the one-time-use unique bank card number with an encryption process to create a ciphertext promotional offer code, wherein the promotional offer code can only be decrypted back to the one-time-use unique bank card number using information identifying a product for which use of the promotional offer is authorized, and issuing the ciphertext promotional offer code as part of a promotion.

In some embodiments, the method further includes steps of creating a decryption algorithm configured to receive as input the ciphertext promotional offer code and the information identifying the product for which use of the promotional offer is authorized. If and only if the ciphertext promotional offer code and the information identifying the product for which use of the promotional offer is authorized are provided to the decryption algorithm as inputs, the decryption algorithm will output the one-time-use unique bank card number as an output. The decryption algorithm is provided to a POS device at a POS.

In some embodiments, the information identifying the product for which use of the promotional offer is authorized is information such as a stock keeping unit (SKU), a global trade item number (GTIN), a universal product code (UPC), an international article number (ARN), or an Australian product number (APN).

In some embodiments, the POS device is configured to receive information identifying one or more items being purchased in a purchase transaction, receive the ciphertext promotional offer code as at least partial payment for the purchase transaction, and attempt to decrypt the ciphertext promotional offer code using the decryption algorithm and the information identifying the one or more items being purchased. The attempt to decrypt the ciphertext promotional offer code includes steps of, for each item of the one or more items being purchased and until the earlier of decryption of the one-time-use unique bank card number and when all of the information identifying the one or more items being purchased has been tried using the decryption algorithm, providing the ciphertext promotional offer code and information identifying one of the one or more items being purchased as inputs to the decryption algorithm and determining whether any output of the decryption algorithm is the one-time-use unique bank card number.

In some embodiments, the step of determining whether any output of the decryption algorithm is the one-time-use unique bank card number uses a process such as for each output of the decryption algorithm, determining whether such output begins with a valid bank identification number (BIN) accepted by a merchant operating the POS device, for each output of the decryption algorithm, determining whether such output operates as a valid bank card number in a bank card processing system, or for each output of the decryption algorithm, determining whether such output operates as a valid bank card number according to a checksum performed using the Luhn algorithm. In some embodiments, the POS device is configured to attempt to process through a bank card processing system at least partial payment for any output of the decryption algorithm that is determined to operate as a valid bank card number.

In some embodiments, the POS device is configured to attempt to decrypt the ciphertext promotional offer code using the decryption algorithm and the information identifying the one or more items being purchased using either serial processing of the information identifying each of the one or more items being purchased or parallel processing of the information identifying at least two of the one or more items being purchased.

In some embodiments, the POS device is configured to utilize a bank card authorization process to attempt to authorize the one-time-use unique bank card number as at least partial payment for the one or more items being purchased. In some embodiments, different encryption processes are used to generate ciphertext promotional offer codes intended for redemption at different retailers, and different decryption algorithms are issued to each individual retailer. Thus a ciphertext promotional offer that would be valid at one retailer POS device may not be valid at a POS device of another retailer.

In some embodiments, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code.

According to further embodiments of the invention, a method for POS-based item-specific redemption of a promotional offer includes a step of providing a POS device including one or more input mechanisms adapted to receive information identifying one or more items being purchased in a purchase transaction and a ciphertext promotional offer code as at least partial payment for the purchase transaction. The method further includes steps of receiving, using one of the one or more input mechanisms of the POS device, the information identifying the one or more items being purchased in the purchase transaction and receiving, using one of the one or more input mechanisms of the POS device, the ciphertext promotional offer code as at least partial payment for the purchase transaction. The method also includes a step of utilizing a processor operatively connected to the POS device to operate a decryption algorithm that receives as inputs the ciphertext promotional offer code and the information identifying the one or more items being purchased in the purchase transaction. If and only if one piece of the information identifying the one or more items being purchased identifies a product for which use of the ciphertext promotional offer is authorized, when the ciphertext promotional offer code and the piece of the information identifying the product for which use of the ciphertext promotional offer is authorized are provided to the decryption algorithm as inputs, the decryption algorithm outputs a valid one-time-use unique bank card number as an output to the POS device.

In some embodiments, the one or more input mechanisms include one or more mechanisms such as a keyboard, a touchscreen, an optical scanner, a microphone, a camera, or a wireless communication device. In some embodiments, the input mechanism used for receiving the information identifying the one or more items being purchased and the input mechanism used for receiving the ciphertext promotional offer code are the same. In some embodiments, the input mechanism used for receiving the information identifying the one or more items being purchased and the input mechanism used for receiving the ciphertext promotional offer code are different input devices.

In some embodiments, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code. In some embodiments, the piece of information identifying the product for which use of the ciphertext promotional offer is authorized includes information such as a SKU, a GTIN, a UPC, an ARN or an APN.

In some embodiments, the POS device is configured to attempt to decrypt the ciphertext promotional offer code using the decryption algorithm and the information identifying the one or more items being purchased. The attempt includes steps of, for each item of the one or more items being purchased and until the earlier of decryption of the valid one-time-use unique bank card number and when all of the information identifying the one or more items being purchased has been tried using the decryption algorithm, providing the ciphertext promotional offer code and information identifying one of the one or more items being purchased as inputs to the decryption algorithm and determining whether any output of the decryption algorithm is the valid one-time-use unique bank card number.

In some embodiments, the step of determining whether any output of the decryption algorithm is the valid one-time-use unique bank card number includes a process such as for each output of the decryption algorithm, determining whether such output begins with a valid bank identification number (BIN) accepted by a merchant operating the POS device, for each output of the decryption algorithm, determining whether such output operates as a valid bank card number in a bank card processing system, or for each output of the decryption algorithm, determining whether such output operates as a valid bank card number according to a checksum performed using the Luhn algorithm. In some embodiments, the POS device is configured to attempt to process through a bank card processing system at least partial payment for any output of the decryption algorithm that is determined to operate as a valid bank card number.

In some embodiments, the POS device is configured to attempt to decrypt the ciphertext promotional offer code using the decryption algorithm and the information identifying the one or more items being purchased using a method such as serial processing of the information identifying each of the one or more items being purchased or parallel processing of the information identifying at least two of the one or more items being purchased. In some embodiments, the POS device is configured to utilize a bank card authorization process to attempt to authorize the one-time-use unique bank card number as at least partial payment for the one or more items being purchased.

In accordance with additional embodiments of the invention, a method for issuing a promotional offer that is only redeemable for a specific item includes steps of associating a one-time-use unique bank card number with a promotional offer, encrypting the one-time-use unique bank card number with an encryption process to create a ciphertext promotional offer code containing encrypted information including the one-time-use bank card number and one or more product identifiers identifying one or more products for which use of the one-time-use bank card number is authorized, wherein when the ciphertext promotional offer code is decrypted it generates the one-time-use unique bank card number and the one or more product identifiers, and issuing the ciphertext promotional offer code as part of a promotion.

In some embodiments, the method further includes steps of creating a decryption algorithm configured to receive the ciphertext promotional offer code and to output the one-time-use unique bank card number and the one or more product identifiers. The decryption algorithm is provided to a POS device at a POS. The one or more product identifiers include information identifying one or more products for which use of the promotional offer is authorized. In some embodiments, the information identifying the product for which use of the promotional offer is authorized is information such as a stock keeping unit (SKU), a global trade item number (GTIN), a universal product code (UPC), an international article number (ARN), or an Australian product number (APN).

In some embodiments, the POS device is configured to receive information identifying one or more items being purchased in a purchase transaction, to receive the ciphertext promotional offer code as at least partial payment for the purchase transaction, and to attempt to decrypt the ciphertext promotional offer code using the decryption algorithm. The POS device then compares the information identifying the one or more items being purchased to the one or more product identifiers obtained by decrypting the ciphertext promotional offer code. If the information identifying one or more items being purchased includes information matching one or more of the product identifiers obtained by decrypting the ciphertext promotional offer code, then the POS device processes the one-time-use unique bank card number as at least partial payment for the purchase transaction.

In some embodiments, the ciphertext promotional offer code further includes an amount of the promotional offer. In some embodiments, the POS device obtains the amount of the promotional offer as part of the decryption step. In some embodiments, when the information identifying one or more items being purchased includes information matching one or more of the product identifiers obtained by decrypting the ciphertext promotional offer code, the POS device attempts to process the one-time-use bank card number as at least partial payment for the purchase transaction in an amount matching the amount of the promotional offer.

In some embodiments, the POS device is configured to utilize a bank card authorization process to attempt to authorize the one-time-use unique bank card number as at least partial payment for the one or more items being purchased. In some embodiments, different encryption processes are used to generate ciphertext promotional offer codes intended for redemption at different retailers, and different decryption algorithms are issued to each individual retailer. Thus a ciphertext promotional offer that would be valid at one retailer POS device may not be valid at a POS device of another retailer.

In some embodiments, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code.

According to further embodiments of the invention, a method for POS-based item-specific redemption of a promotional offer includes a step of providing a POS device including one or more input mechanisms adapted to receive information identifying one or more items being purchased in a purchase transaction and a ciphertext promotional offer code as at least partial payment for the purchase transaction. The method further includes steps of receiving, using one of the one or more input mechanisms of the POS device, the information identifying the one or more items being purchased in the purchase transaction and receiving, using one of the one or more input mechanisms of the POS device, the ciphertext promotional offer code as at least partial payment for the purchase transaction. The method also includes a step of utilizing a processor operatively connected to the POS device to operate a decryption algorithm that receives the ciphertext promotional offer code and decrypts the ciphertext promotional offer code to obtain a one-time-use unique bank card number and one or more product identifiers identifying one or more products for which use of the one-time-use bank card number is authorized.

In some embodiments, the one or more input mechanisms include one or more mechanisms such as a keyboard, a touchscreen, an optical scanner, a microphone, a camera, or a wireless communication device. In some embodiments, the input mechanism used for receiving the information identifying the one or more items being purchased and the input mechanism used for receiving the ciphertext promotional offer code are the same. In some embodiments, the input mechanism used for receiving the information identifying the one or more items being purchased and the input mechanism used for receiving the ciphertext promotional offer code are different input devices.

In some embodiments, the ciphertext promotional offer code includes information such as a string of alphanumerical digits, a one-dimensional barcode, a two-dimensional barcode, a computer-readable code storable on a non-transitory computer-readable medium, a quick response (QR) code, a pulsed-light code, or an auditory code. In some embodiments, the one or more product identifiers includes information such as a SKU, a GTIN, a UPC, an ARN or an APN.

In some embodiments, the POS device is configured to attempt to decrypt the ciphertext promotional offer code using the decryption algorithm. In some embodiments, the POS device is further configured to compare the one or more product identifiers to information identifying one or more items being purchased. In some embodiments, the POS device is configured to utilize a bank card authorization process to attempt to authorize the one-time-use unique bank card number as at least partial payment for the one or more items being purchased when the information identifying the one or more items being purchased includes information matching one or more of the one or more product identifiers. In some embodiments, the information identifying the one or more items being purchased includes information such as a SKU, a GTIN, a UPC, an ARN, or an APN.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), digital versatile disc ("DVD") media, Blu-Ray media, or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant (PDA) or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like. In some embodiments, computer device 10 is or forms part of a POS system such as a register, a sales tablet, a sales mobile device such as a smart phone, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid state drive, a removable solid state drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid state drives, hard disk drives, magnetic disk drives, tape drives and optical disk drives. A mass storage device 26 may read from and/or write to solid state memory, a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. When computer device is or is part of a POS system, additional input interface examples include SKU scanning devices, near-field-communication ("NFC") contactless payment card readers, EMV-standard card readers, magnetic card readers, keypads, NFC product scanners, associated touch screens, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks. In some embodiments, one or more input interfaces 20 may be provided by an external device connected to a port of the system (e.g., as a peripheral device).

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
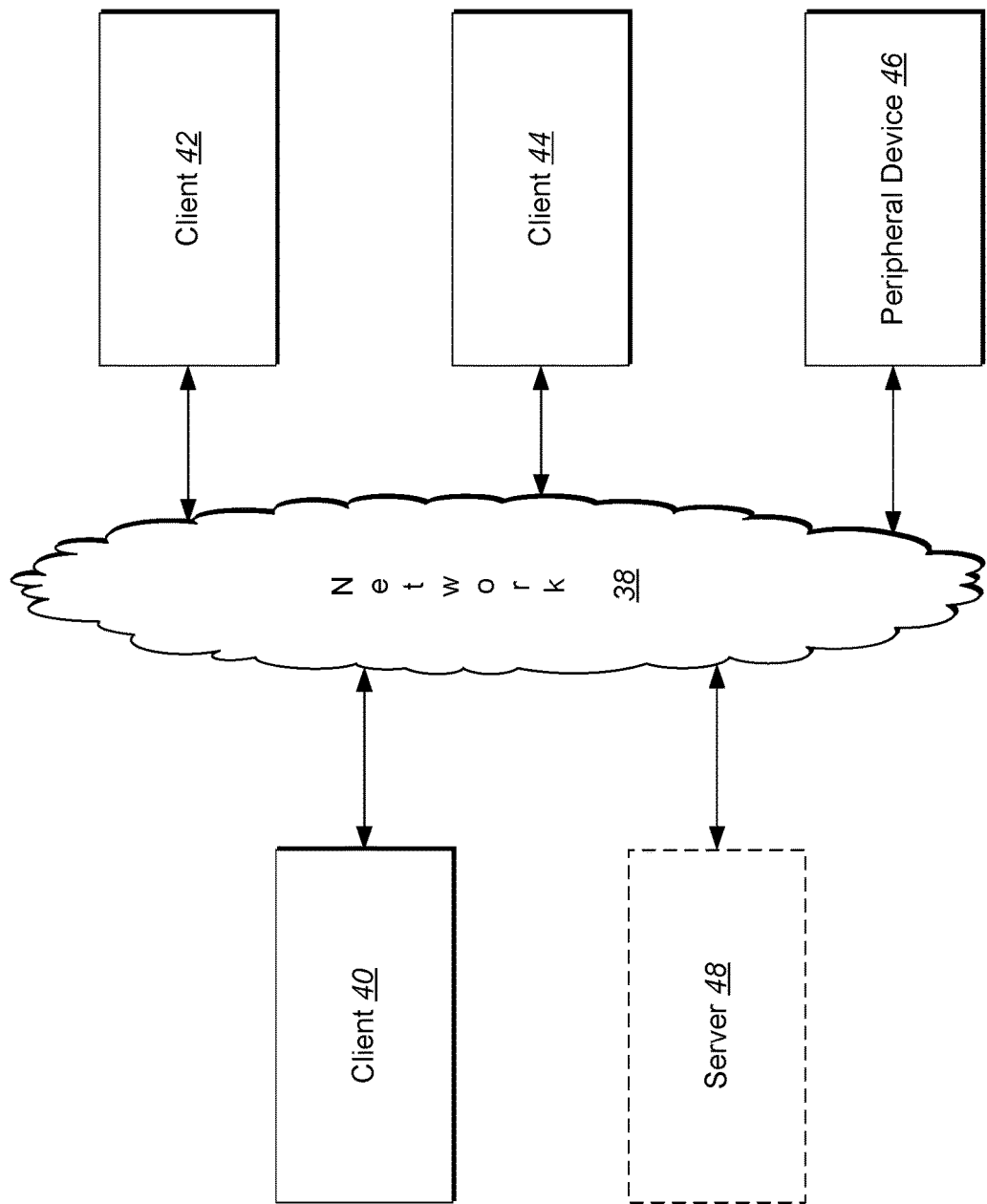
FIG. 2 shows a representative networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
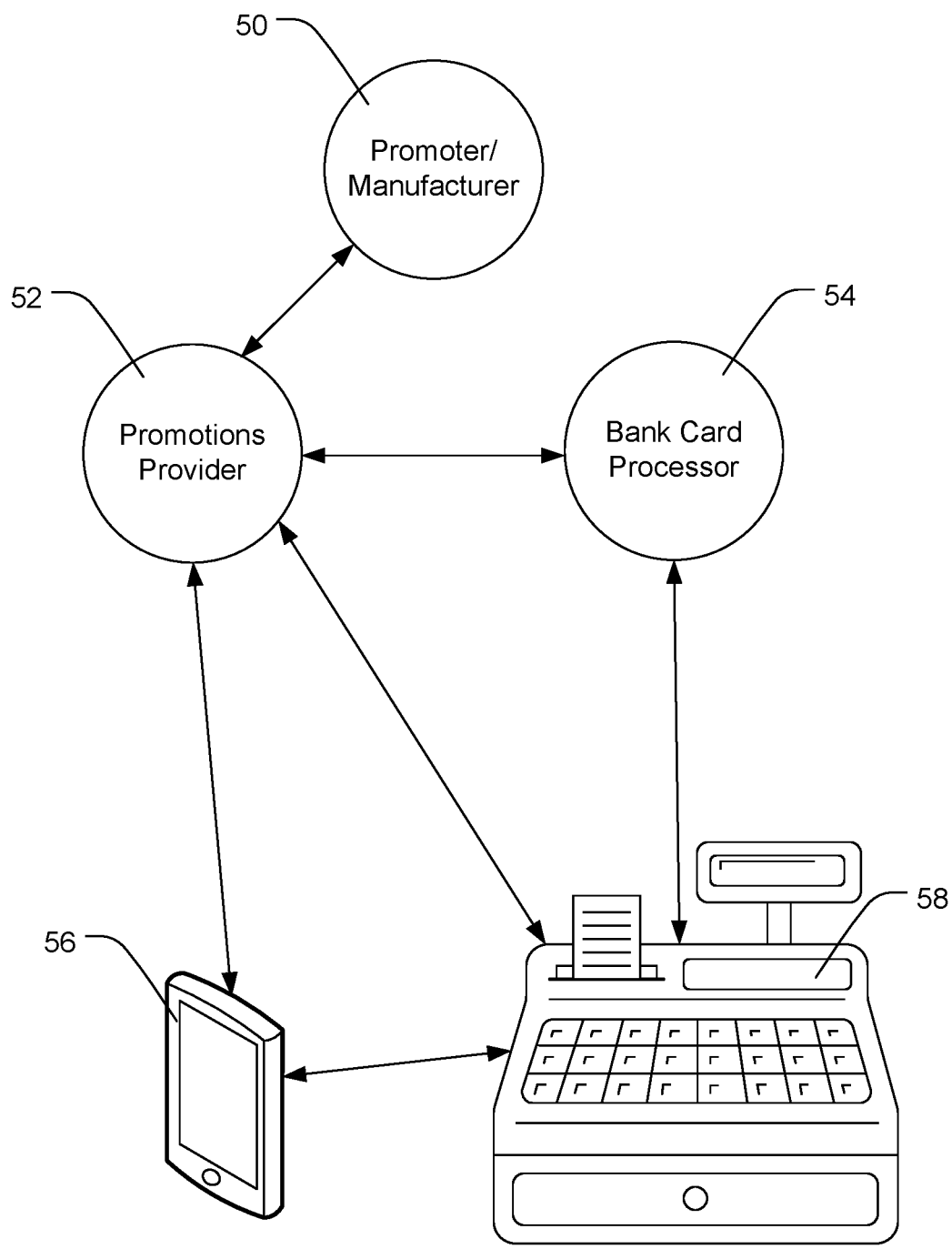
FIG. 3 shows one example of a representative environment in which embodiments of the invention may be implemented.

FIG. 3 illustrates one representative environment in which embodiments of the invention for facilitating merchant- and item-specific redemption of a serialized promotional offer to a purchase may be implemented. The promotion environment includes a promoter 50, which in some instances is a manufacturer of products or a provider of services, or in other instances is an entity or organization operating on behalf of a manufacturer or other provider. In some circumstances, the promoter 50 may be a retail store or chain electing to offer discounts on the products it carries or services it sells. In other circumstances, the promoter 50 is a third party tasked with representing a retail store or chain. Accordingly, it should be understood that the promoter 50 illustrated in FIG. 3 may be any of a number of entities in the retail, wholesale, and promotions industry and is not intended to be limited to any particular role. Nevertheless, the promoter 50 is the entity that determines to begin a promotional campaign. The promoter 50 determines to generate a promotion on products or services, and engages a promotions provider 52 to operate the promotion on its behalf. In a typical example of a promotion, a promotion campaign will involve generation of a number of coupons representing a discount on the goods or services of the manufacturer/service provider that is either the promoter 50 or is represented by the promoter 50.

Historically and even often today, promotions typically involved printing and distribution of a number of generic or identical coupons in newspapers, magazines, mailers, and the like. The provision of such coupons entitled the bearer thereof to receive a discount (a percentage or set amount off) at any retailers accepting coupons provided by the manufacturer (or issued by an issuer on behalf of the manufacturer). Typically, such coupons are valid for a limited period of time, after which they are no longer accepted at retailers or other locations. The provision of generic or identical paper coupons in this manner leads to certain problems for the parties involved in the promotional offer and redemption process. Often, it can be difficult to estimate a rate at which the promotional offers will be redeemed. Additionally, paper coupons are subject to duplication attempts whereby more coupons may enter the stream of commerce than the promoter 50 originally intended. Accordingly, promoters 50 cannot predict the frequency at which coupons will be redeemed, or do anything to stop a promotion that results in greater redemption than expected, whether due to fraudulent causes or to other innocent causes. As a result, some promotions have resulted in promotion overspending.

Traditional coupons are typically entered into POS computer systems by the owners of the POS, either once near the start of a promotion, or on an ongoing basis as each coupon is received. Some traditional coupons are printed with bar codes or other redemption indicia that facilitates computer-based scanning or other automated entry by the POS systems, but traditional coupons are typically identical such that they all share an identical bar code or other scanning indicia. Again, such coupons are not at all fraud resistant, and furthermore they lack any mechanism that permits rapid verification of coupon authenticity and redemption in a way that would permit rapid reconciliation and settlement. Additionally, limiting use of the coupons to specific items actually purchased requires either that the retailer enters the coupon into its system and associates it with limited items for sale, or relies on checkout personnel to ensure that associated items were actually purchased.

Accordingly, the retailer is forced to accept a loss on sales until enough time has passed to allow for sending in received coupons, transport of such coupons to an offsite (often out-of-country to take advantage of reduced labor costs) location for verification and counting, auditing, and any other reconciliation processes before the retailer is ever reimbursed for applied discounts. Additionally, if the coupon is entered incorrectly at the POS systems, it can result in coupons being redeemed for more or less than face value, again leading to problems for the retailer and/or the promoter 50.

Systems and methods in accordance with embodiments of the invention address these and similar concerns. In the representative environment illustrated in FIG. 3, the promoter 50 (which may, in some embodiments, be a manufacturer) enters into a relationship with a promotions provider 52. In at least some embodiments, there is an electronic communicative link established between the promoter 50 and the promotions provider 52, whereby a representative of the promoter 50 is able to access systems operated by the promotions provider 52 and associated with a promotional campaign so as to review associated reports and/or to manage one or more aspects of the promotional campaign. The representative of the promoter 50 may be any person or group of persons tasked with managing the promotion on behalf of the promoter 50. In other embodiments, an electronic communications link is not established between the promoter 50 and the promotions provider 52. In some other embodiments, the promoter 50 and the promotions provider 52 are the same business entity or are divisions within a single business entity.

In the embodiment illustrated in FIG. 3, the promotions provider 52 is tasked with operating or directly managing a promotional campaign on behalf of the promoter 52. The promoter 50 and the promotions provider 52 initially establish the baseline operating conditions for the promotion. By way of example, the initial step may include defining that the promoter 52 wishes to offer a promotional campaign that will result in a total promotions redemption spend of $500,000 (or whatever desired amount), with that redemption spend being allocated to $5 coupons. Accordingly, the anticipated promotional campaign has a target of 100,000 redeemed coupons. In some embodiments, either or both of the promoter 50 or the promotions provider 52 has information from past promotional campaigns that will dictate an approximate number of coupons or other promotional offers that will have to be issued for the promotion to reach the anticipated/desired level of redemption.

To fund the promotional campaign, the promoter 50 transfers an appropriate amount of money (e.g., the $500,000 plus any fees charged by the promotions provider 52) to the promotions provider 52. At that time, the promotions provider 52 internally serializes an appropriate number of coupons or promotional offers (if in a form other than a coupon), whereby each coupon or promotional offer receives its own serial number. Because each coupon or promotional offer is individually serialized, its issuance and redemption can be tracked for a variety of purposes, including preventing fraud and double use attempts as well as permitting rapid reconciliation and settlement as well as tracking use for purchase of allowed items (e.g., filtered to be SKU or other identifier specific).

Accordingly, the promotions provider 52 in some embodiments adds information about the coupons or promotional offers and their serial numbers to a blockchain. Accordingly, because the coupons or promotional offers are recorded on the blockchain, they are resistant to tampering and can be readily tracked. As coupons and promotional offers are issued (offered to consumers) and then redeemed, their accompanying records on the blockchain are updated in some embodiments such that a comprehensive record of the coupons or offers is maintained. In some embodiments, redemption attempts can be checked against the blockchain before authorizing redemption to prevent fraudulent double redemption attempts, coupon/offer copying, and the like.

In some embodiments, the serial numbers assigned to the individual coupons or promotional offers are only used internally to the promotions provider 52. The serial numbers operate as an internal tracking mechanism used by the promotions provider in processes such as tracking offers issued and redeemed, and in generating reports. Such reports may include internal reports as well as reports issued to the promoter 50.

In some embodiments, the promotions provider 52 communicates with a bank card processor 54 to facilitate transactions with the coupons or other promotional offers. The bank card processor 54 may be any of a variety of current or future existing payment processors capable of authorizing and processing payments on bank cards (e.g., credit cards). By way of example, the bank card processor 54 may be an entity such as Mastercard Incorporated, capable of processing MasterCard-branded bank cards. Of course, the bank card processor 54 may be any desirable bank card processor or payment processor. In some embodiments, the promotions provider 52 and the bank card processor 54 are the same business entity or are divisions within a single business entity.

In some embodiments, as illustrated in FIG. 3, the promotions provider 52 also communicates with a consumer computing device 56 that is operated by a consumer. Accordingly, an at least intermittent communicative connection is established between one or more computing devices of the promotions provider 52 and the consumer computing device 56. Such communicative connection may be established using existing network infrastructure, including wired and wireless connections, and including use of portions of the Internet, for example. The consumer computing device 56 may be any of a variety of devices in accordance with varying embodiments of the invention. By way of example, the consumer computing device 56 may be a smart phone, a tablet computer, a laptop computer, a desktop computer, a special-purpose computing device such as an application-specific device, and the like.

In some embodiments, a coupon or promotional offer is issued and distributed using traditional means, such as in newspapers, by mail, or by other distribution mechanisms. In such embodiments, however, the coupon or promotional offer is distributed in each individual instance as or with a unique ciphertext promotional offer code for each coupon or offer, to ensure that the coupon or offer is resistant to duplication or other fraudulent activity and to further ensure that the coupon or offer can only be used for an authorized item purchase. In some instances, the ciphertext promotional offer code also ensures that the coupon or offer can only be used at a desired retailer.

As used herein the term ciphertext promotional offer code is intended to encompass any encrypted or encoded promotional offer, regardless of whether the promotional offer is provided as a tangible item (e.g. a coupon), a string of alphanumeric characters, a data file, or any other format. By way of example only, the ciphertext promotional offer code is provided in some embodiments as a string of numeric characters that in itself does not operate as a bank card number. In other embodiments, the ciphertext promotional offer code is provided as a string of alphanumeric characters, potentially including both letters and numbers or even special characters. In still other embodiments, the ciphertext promotional offer code is provided as a one-dimensional bar code. In other embodiments, the ciphertext promotional offer code is provided as a two-dimensional bar code such as a QR code. In other embodiments, the ciphertext promotional offer code is provided as a digital file containing, for example, binary data that can be read by a POS computing device and/or the consumer computing device 56, such as using a wireless connection or a wired reader. There are no particular limits on the form that the ciphertext promotional offer code may take, including optical forms such as flashes of light and audible forms such as a series of tones.

Regardless of the form taken by the ciphertext promotional offer code, the ciphertext promotional offer code of certain embodiments represents an encrypted form of a unique bank card number or other payment number (e.g., a gift card number, etc.). The encryption used to encrypt the bank card number (the bank card number represents the original plaintext before encryption) into the ciphertext promotional offer code may take any desirable form as long as the encryption used is a form such that the ciphertext promotional offer code is capable of decryption to allow recovery of the original bank card number at the POS, when the consumer presents the ciphertext promotional offer code to redeem the promotional offer. When the ciphertext promotional offer code is presented at the POS, a POS device decrypts the unique bank card number associated with the promotional offer from the ciphertext promotional offer code, as will be described in more detail below, and is then able to apply a balance of the bank card number to a purchase as at least partial payment.

In certain additional embodiments, the ciphertext promotional offer code represents an encrypted form of the unique bank card number and one or more product identifiers for one or more products for which use of the promotional offer is authorized. The encryption used to encrypt the bank card number and the one or more product identifiers (the bank card number and the one or more product identifiers represent the original plaintext before encryption) into the ciphertext promotional offer code may take any desirable form as long as the encryption used is a form such that the ciphertext promotional offer code is capable of decryption to allow recovery of the original bank card number and the one or more product identifiers at the POS, when the consumer presents the ciphertext promotional offer code to redeem the promotional offer. When the ciphertext promotional offer code is presented at the POS, a POS device decrypts the unique bank card number associated with the promotional offer and the one or more product identifiers from the ciphertext promotional offer code, as will be described in more detail below, and is then able to apply a balance of the bank card number to a purchase as at least partial payment.

In certain additional embodiments, the ciphertext promotional offer code represents an encrypted form of the unique bank card number, one or more product identifiers for one or more products for which use of the promotional offer is authorized, and one or more promotional offer amounts. The encryption used to encrypt the bank card number, the one or more product identifiers, and the one or more promotional offer amounts (the bank card number, the one or more product identifiers, and the one or more promotional offer amounts represent the original plaintext before encryption) into the ciphertext promotional offer code may take any desirable form as long as the encryption used is a form such that the ciphertext promotional offer code is capable of decryption to allow recovery of the original bank card number, the one or more product identifiers, and the one or more promotional offer amounts at the POS, when the consumer presents the ciphertext promotional offer code to redeem the promotional offer. When the ciphertext promotional offer code is presented at the POS, a POS device decrypts the unique bank card number associated with the promotional offer, the one or more product identifiers, and the one or more promotional offer amounts from the ciphertext promotional offer code, as will be described in more detail below, and is then able to apply a balance of the bank card number to a purchase as at least partial payment.

Accordingly, in some embodiments, the promotions provider 52, in running the promotion, makes a determination to issue a coupon or promotional offer to the consumer through the consumer computing device 56. This determination may be made in a variety of manners and taking into account a variety of factors. By way of one example, the promotions provider 52 may determine to issue a coupon or promotional offer to the consumer through the consumer computing device 56 based on a geographic location of the consumer computing device 56 (e.g., as determined via a GPS determination or by passage through a geofence as determined by GPS or RFID data). As a specific example of this, a coupon or promotional offer relating to offerings by a local convenience store (e.g., a gasoline promotion, a promotion on fountain drinks, a promotion on snacks, or the like) may be triggered upon passage of the consumer computing device 56 (in this case a mobile device like a smart phone) into a geofenced area surrounding a branch of the convenience store.

As another example of manners and factors in determining to issue a coupon or promotional offer, the consumer may use the consumer computing device to indicate an interest in promotional offers in general or in promotional offers of a particular type. In some embodiments, the consumer uses a program such as a smartphone app or a website that is dedicated to coupons and promotional offers. In other embodiments, the consumer uses a program such as a smartphone app or a website that is dedicated to providing a particular type of service (e.g., a gasoline price/purchase app or website, a supermarket app or website, etc.). Regardless of the app, program, or website used, when the consumer indicates interest in coupons or other promotional offers, the promotions provider 52 makes a determination as to whether the consumer is eligible for any applicable coupons or promotional offers.

When the promotions provider 52 determines that the consumer is eligible to receive a coupon or promotional offer, the system does not necessarily immediately issue the coupon or promotional offer. Instead, in some embodiments, the promotions provider systems initially present information about the promotional offer to the consumer computing device 56, whereby the consumer is enabled to evaluate the promotional offer and determine whether or not the promotional offer is one the consumer wishes to take advantage of. If so, the consumer can so indicate by way of an action, such as an interaction with a program, app, or website, as is known in the art. In other embodiments, such as when the consumer has already expressed an interest in promotional offers or coupons, the promotions provider 52 may immediately proceed to issuing a coupon or formal promotional offer.

At the point where the promotions provider 52 determines to issue a coupon or promotional offer, one of the serialized promotional offers or coupons is allocated to the promotional offer, and a one-time-use bank card number (e.g., a gift card number, in some embodiments) is assigned to the promotional offer or coupon. For example, where the bank card number is a MasterCard number, the bank card number assigned to the promotional offer or coupon may be a sixteen-digit number. The bank card number acts as a redeemable code for redemption of the offer or coupon. Where information about coupons and/or offers is maintained on a blockchain, the bank card number associated with the offer/coupon is recorded to the blockchain, potentially along with information associated with the consumer to whom the offer/coupon is to be issued, along with information indicating that the offer/coupon was issued to the consumer.

As part of the promotional offer or coupon issuance process, the promotions provider associates information identifying a product for which the promotional offer or coupon is authorized with the promotional offer. This information uniquely identifies one or occasionally more products for which use of the promotional offer is authorized. In some embodiments, the information identifying product(s) for which use of the promotional offer is authorized is information such as a SKU, a GTIN, a UPC, an ARN, or an APN. The information identifying authorized product(s) is information that is available to and will be used by the retailer to process a purchase of the item to which the promotional offer or coupon will be applied.

Then, in some embodiments, before the offer or coupon is issued to the consumer, the bank card number is encrypted using an encryption method that generates the ciphertext promotional offer code. In other embodiments, again before the offer or coupon is issued to the consumer, the bank card number and one or more product identifiers or other information identifying one or more products for which use of the promotional offer is authorized are encrypted using an encryption method that generates the ciphertext promotional offer code. In still other embodiments, again before the offer or coupon is issued to the consumer, the bank card number, one or more product identifiers or other information identifying one or more products for which use of the promotional offer is authorized, and one or more promotional offer amounts are encrypted using an encryption method that generates the ciphertext promotional offer code.

Any desired encryption method may be used, so long as an applicable decryption method is available to be run at the POS to recover necessary information. In some embodiments the decryption method is used to recover the bank card number using two items of information. The first item of information is the ciphertext promotional offer code. The second item of information is the product information (e.g., the SKUs, the GTINs, the UPCs, the ARNs, or the APNs) of the products that the consumer is attempting to purchase. If one of the products that the consumer is attempting to purchase is a product for which use of the ciphertext promotional offer code is allowed, the decryption method will regenerate the bank card number allowing it to be used as at least partial payment for the purchase. If, however, none of the products that the consumer is attempting to purchase using the ciphertext promotional offer code is one for which use of the ciphertext promotional offer code is authorized, then the decryption attempt will fail, and the bank card number will not be regenerated. Accordingly, the ciphertext promotional offer code can only be used to purchase authorized items.

In other embodiments, the decryption method is used to recover both the bank card number and the one or more product identifiers or other information identifying one or more products for which the promotional offer is authorized. In still other embodiments, the decryption method is used to recover the bank card number, the one or more product identifiers or other information identifying one or more products for which the promotional offer is authorized, and the one or more promotional offer amounts. In such embodiments, the POS device then is able to check the decrypted one or more product identifiers against information identifying one or more items being purchased as part of the purchase transaction, and can use the bank card number as payment if and only if a match indicates one or more authorized products is part of the purchase transaction.

The promotions provider 52 accordingly associates an applicable decryption algorithm or method with the promotional offer, and distributes the decryption algorithm or method to retailers, such that the retailers will be able to decrypt the ciphertext promotional offer codes on demand at the POS without any further communication being necessary between the POS device and any other entity at the time of offer redemption, representing a significant improvement in functionality over the methods disclosed in the prior Applications. Indeed, embodiments of the invention allow for strictly limiting promotional offer redemption to purchase of intended items only while eliminating communications between the retailer and the promotions provider, thereby speeding the process and allowing the process to occur even if a communicative connection is unavailable between the POS and the promotions provider 52 at the time of offer redemption.

Embodiments of the invention provide further benefits in controlling promotional offer redemption. In some embodiments of the invention, different encryption and decryption methods and algorithms may be used for different retailers or even for individual locations of certain retailers. In this way, redemption of a ciphertext promotional offer code can be further limited such that redemption is only possible at a correct retailer (or retailer location) and for a correct product.

After the bank card number (and, in some embodiments either or both of one or more product identifiers and one or more promotional offer amounts) is encrypted to generate the ciphertext promotional offer code to provide the offer or coupon for the consumer, the offer or coupon containing the ciphertext promotional offer code is then issued to the consumer using the consumer computing device 56. No other consumer receives the same encrypted ciphertext promotional offer code because each ciphertext promotional offer code was generated using a unique bank card number and the associated product identifier or identifiers.

In embodiments where the coupon or promotional offer is to be limited to use with one or more specific products or services, the bank card number associated with the offer/coupon is thus associated with one or more products or services for which redemption of the offer/coupon is authorized, and that authorization is also recorded. In some embodiments, the authorized product(s) or service(s) is/are recorded on the blockchain, and in other embodiments, the authorized product(s) or service(s) is/are recorded separately from the blockchain.

The consumer may receive and use the coupon or offer in a variety of different ways. In some embodiments, the consumer receives a printable coupon, and may use a printing device (not shown in FIG. 3) to print the coupon for use at a POS. The printable coupon includes the ciphertext promotional offer code and/or scannable indicia representative of the ciphertext promotional offer code to facilitate redemption of the coupon at the POS. In other embodiments, the consumer receives an electronic coupon that the consumer is able to redeem at the POS by, for example, displaying the electronic coupon on his or her smartphone (e.g., the consumer computing device 56) either for scanning or manual entry of the ciphertext promotional offer code at a POS device. Accordingly, FIG. 3 illustrates that the system of some embodiments includes a POS device 58 or system that is adapted to receive entry of the ciphertext promotional offer code, either from the POS operator or from the consumer, such as using consumer computing device 56. In some embodiments, the consumer computing device 56 and the POS device 58 are able to communicate with each other, such as wirelessly (e.g. near-field communication (NFC)). In other embodiments, the consumer receives the ciphertext promotional offer code and is able to store it on a consumer magnetic strip adapted to be read by traditional magnetic strip readers at the POS device 58.

When the POS device 58 receives the ciphertext promotional offer code, the POS device 58 initiates a decryption process using the decryption method or algorithm previously provided by the promotions provider 52. In some embodiments, the decryption method or algorithm is provided to operators of the POS devices as an open-source program. The decryption process of some embodiments takes as inputs the ciphertext promotional offer code and the information identifying the product, products, service, or services that the consumer is attempting to purchase. The decryption process of such embodiments uses the unique identifiers of the individual product(s) or service(s) being purchased (e.g., the UPC, SKU, etc.) as a key or template cryptographically applied to the ciphertext promotional offer code to determine if a valid bank card number results from the decryption process.

In some embodiments, the POS device 58 processes the information identifying each of the product(s) or service(s) being purchased serially in its attempt to decrypt the ciphertext promotional offer code to generate a valid bank card number. In other embodiments, the POS device 58 processes information identifying two or more products or services being purchased in parallel. The POS device 58 processes the information identifying the product(s) or service(s) being purchased until either all products or services have been considered or a valid bank card number is generated.

The POS device 58 of certain embodiments utilizes any of a variety of methods to determine whether the decryption process has generated a valid bank card number. By way of example only, the POS device 58 of some embodiments determines whether the output of the decryption process begins with a valid BIN. As another example, the POS device 58 of some embodiments determines whether the output of the decryption process operates as a valid bank card number according to a checksum performed using the Luhn algorithm. As another example, the POS device 58 of some embodiments may use the output of the decryption process to attempt to obtain payment authorization from the bank card processor 54 using a traditional payment authorization network. If the consumer's purchase includes no authorized product or service, the decryption process will fail, and the unique bank card number will not be regenerated. Accordingly, through one straightforward process implemented solely on the POS device 58, the ciphertext promotional offer code ensures that the promotional offer cannot be used except for the authorized product or service.

In other embodiments, the decryption process does not require the unique identifiers of the product(s) or service(s) being purchased to decrypt the ciphertext promotional offer code. Instead, the product identifiers or other information identifying the one or more products for which use of the ciphertext promotional offer code is authorized are cryptographically contained within the ciphertext promotional offer code. Accordingly, the POS device decrypts the ciphertext promotional offer code without using purchased product information as a seed, but instead after decryption still compares purchased product identifying information (e.g., the UPC, SKU, etc.) to the decrypted one or more product identifiers to ensure that a bank card authorization attempt only occurs when a match between purchased products and authorized products is present. Importantly, however, this decryption and matching is enabled to occur at the POS device without requiring a communication between the POS and the promotions provider 52 or any other entity at the time of sale, using only the decryption method or algorithm previously provided to the POS device, typically at a convenient time.

Accordingly, the various embodiments of the invention ensure that the promotional offer can only be redeemed if three requirements are satisfied. The first requirement ensures that the consumer presented a coupon or promotional offer at the POS and took action toward redeeming it (e.g., scan verification). If the ciphertext promotional offer code was not presented at the POS, there would have been no decryption attempt. The second requirement ensures that the consumer purchased the product for which the promotional offer was authorized (product validation). In some embodiments, if the correct product is not a part of the transaction, then the decryption attempt would fail and redemption of the promotional offer cannot occur. In other embodiments, the POS device is enabled to perform a product validation matching step after decryption to ensure that an authorized product (or products) is part of the purchase transaction. The third requirement ensures that the merchant is fairly paid full value for redemption of the promotional offer (payment). When the ciphertext promotional offer code is presented and the correct product is present, the unique bank card number is generated and can then be used as partial payment via an authorization transaction with the bank card processor 54 as is traditional. The transaction is only authorized when the unique bank card number is funded and has not been previously used. Accordingly, embodiments of the invention eliminate opportunity for fraud and facilitate management of the promotional campaign.

When the decryption process is successful, the POS device 58 accordingly obtains a bank card number that it can authorize with the bank card processor 54. Accordingly, the POS device 58 is in at least transient or intermittent communicative connection with the bank card processor 54. The bank card processor 54 performs an authorization step to verify that the bank card number is valid and unused, which step may be performed in part by communications with the promotions provider 52 (e.g., between the bank card processor 54 and the promotions provider 52) in at least some embodiments. Accordingly, the promotions provider 52 has a communicative connection with the bank card processor 54. The promotions provider 52 can then check the bank card number against its records to ensure that the bank card number is valid and has not been used, and can update its records, including the blockchain, to reflect that the coupon or other promotional offer associated with the bank card number has been used and cannot be used again. Assuming the coupon or other promotional offer has not yet been used and is otherwise still valid (an applicable promotional period has not expired or passed the expiration date assigned to the bank card number), an authorization is transmitted back to the POS device 58 by the bank card processor 54.

Accordingly, per methods such as these, real-time controls can be exerted on the redemption of promotional offers to ensure that promotional offers are item-specific, product-specific, service-specific and the like. Where an issued promotional offer (e.g., associated with a ciphertext promotional offer code) is attempted to be redeemed for products or services not associated with the offer, the attempt can be declined even if there is a balance remaining associated with the offer. Such declining happens in real time and prevents use of promotional balances for items such as products or services for which the offer was not intended.

Figure 5:
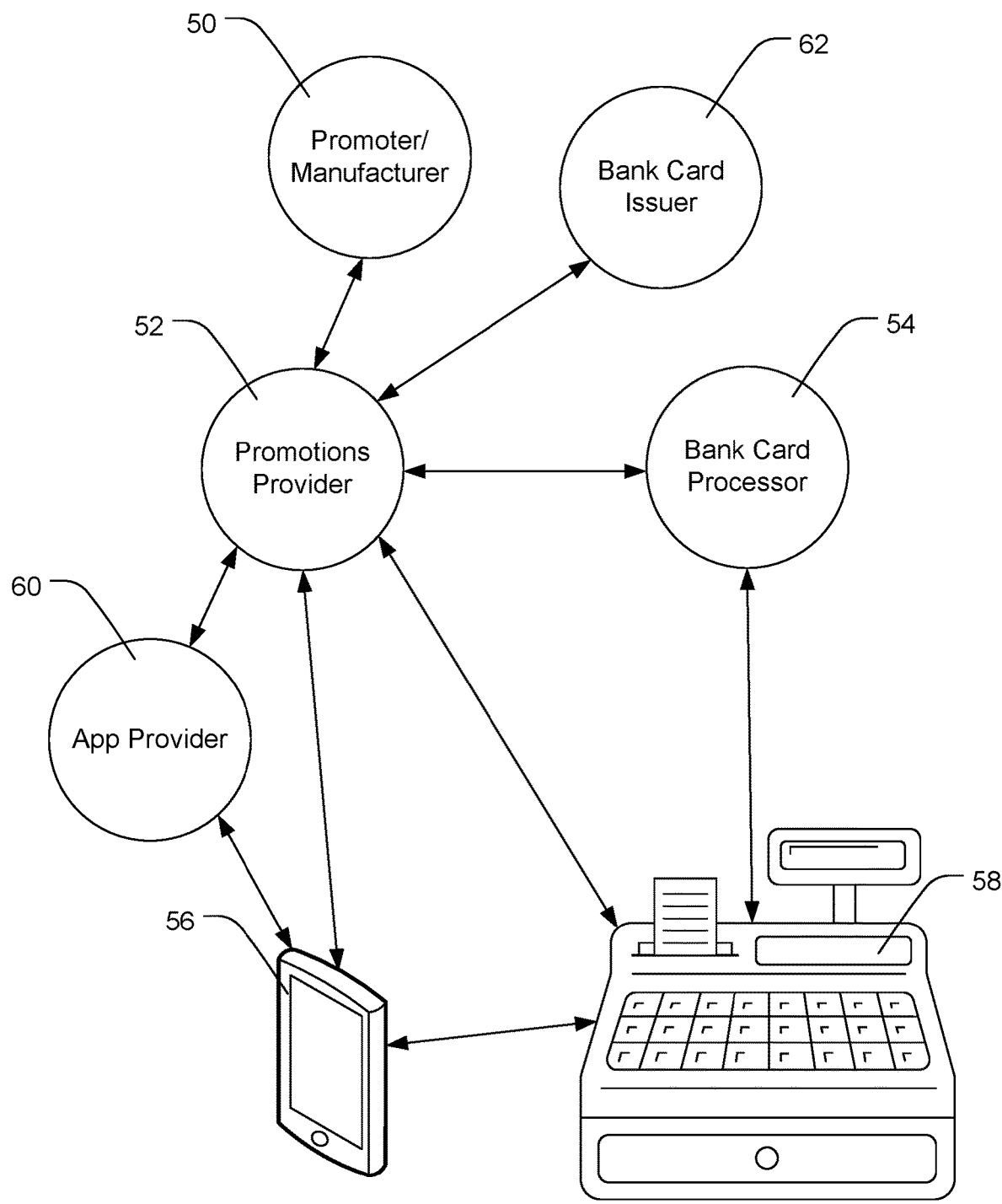
FIG. 5 shows another example of a representative environment in which embodiments of the invention may be implemented.
Figure 6:
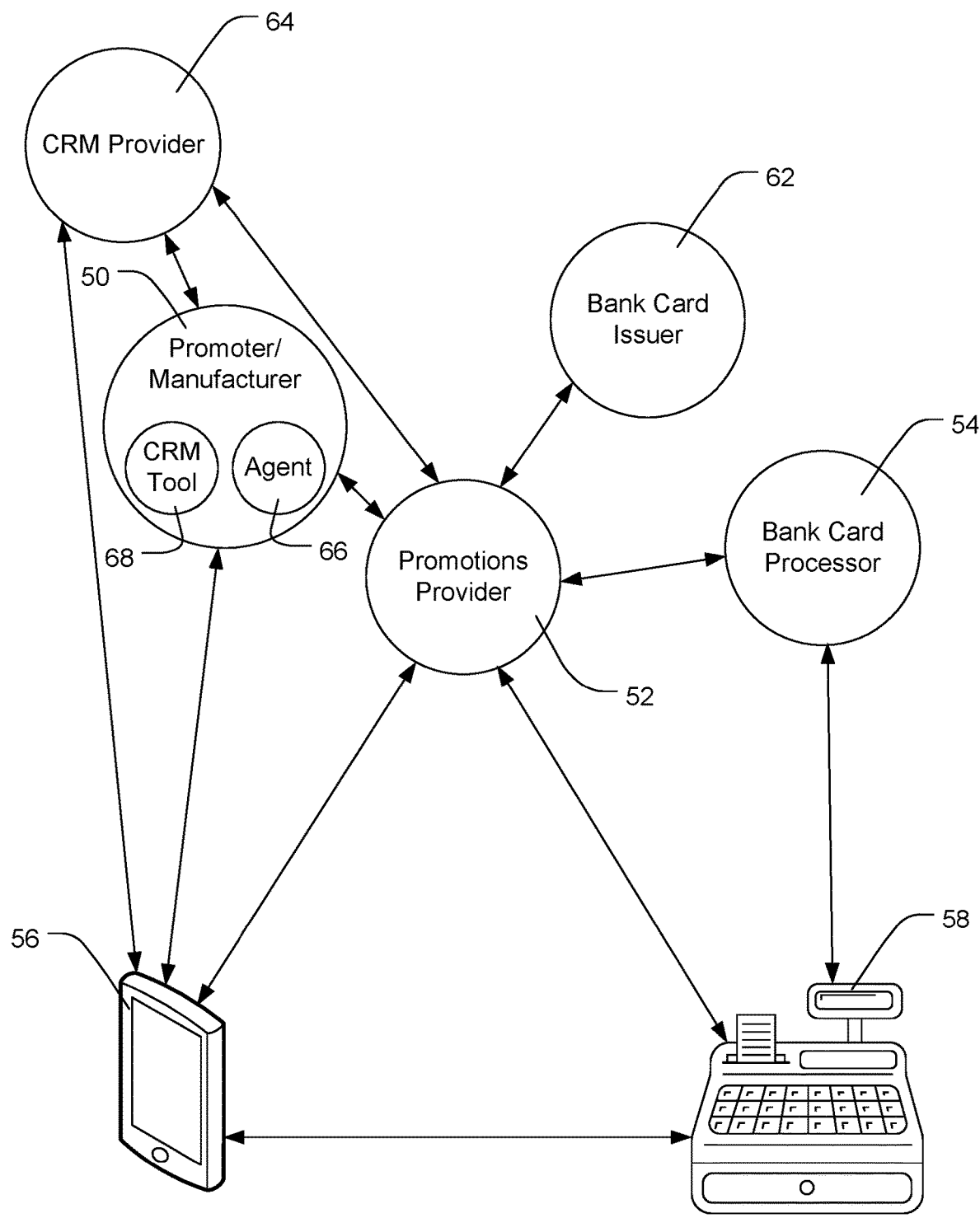
FIG. 6 shows another example of a representative environment in which embodiments of the invention may be implemented.

Embodiments of the invention leverage the features discussed herein into a customer relationship management environment, such that issuance and use of promotional offers are facilitated. FIG. 6 illustrates one embodiment of a customer relationship management environment in which illustrative embodiments of the invention may be implemented. This embodiment of an environment is similar to previously and later-discussed environments shown in FIGS. 3-5. In this environment, however, the environment also includes a customer relationship management (CRM) provider 64. In some embodiments the CRM provider 64 is a separate entity as illustrated in FIG. 6. In other embodiments, the CRM provider 64 is also one of the other entities illustrated in FIG. 6, such as the promoter or manufacturer 50 or the promotions provider 52. Accordingly, embodiments of the invention are not limited to implementation in environments identical to FIG. 6.

The CRM provider 64 in the illustrated embodiment provides CRM support to the promoter or manufacturer 50 and/or to one or more customer service agents 66 employed by the promoter or manufacturer 50. The customer service agents 66 in some embodiments are in-house employees of, for example, the manufacturer 50, and in other embodiments, are employed to act as outside customer service agents of the manufacturer, such as in a call center provided by, for example, a staffing support service. Accordingly, there is no specific requirement that the customer service agent 66 is physically located at the promoter or manufacturer 50 or is even directly employed by the promoter or manufacturer 50. In some embodiments, customer support is provided by an employee other than a dedicated customer service employee such as customer service agent 60 while still falling within the scope of embodiments of the invention described herein, so FIG. 6 is not intended to limit application to a situation where customer support is provided by a specific person.

Regardless of the specific location of the customer service agent 66 or whether support or other client relationship management efforts is provided by some other person, the person providing client relationship management often utilizes a CRM tool 68 provided by the CRM provider 64 to manage the client relationship. The CRM tool 68 of some embodiments is an installable application operating on a local computer machine. In other embodiments, the CRM tool 68 operates as a downloadable tool (whether installed or simply locally opened). In other embodiments, the CRM tool 68 is provided by the CRM provider 64 as a web-based application that operates remotely and is accessed locally by the agent 66 (or equivalent role), such as using a web browser or other access program. The CRM tool 68 of the various embodiments is provided by or integrated into the suite of tools currently provided or that may be provided in the future by any CRM provider 64, such as, for example, Salesforce.com CRM, SAP CRM, Oracle, Microsoft Dynamics CRM, Act! CRM, Adempiere, Base CRM, Capsule, CiviCRM, Dolibarr, Epesi CRM, GNU Enterprise, Group-Office, HubSpot CRM, Neolane, Nutshell CRM, Pega CRM, Pipedrive, Pivotal CRM, Really Simple Systems, SageCRM, Salesbox CRM, Siebel, SAP Cloud for Customer, Streak, SugarCRM, SuiteCRM, SuperOffice CRM, TeamLab, Tryton, WORKetc, Zoho CRM, or the like, regardless of the manner in which the CRM tool 68 is provided.

The agent 66 uses the CRM tool to manage customer relationships, typically with a plurality of customers of the manufacturer 50. Typical CRM tools and/or providers utilize data analysis about customers' history with a company to improve business relationships with the company's customers, especially customer retention, so as to drive sales growth. Typical CRM systems compile data from multiple communications channels such as telephone, chat, email, website interactions, social media, and marketing tools, so as to learn more about target audiences and how to cater to customers' needs. Such traditional systems, however, have been limited in the manner in which the manufacturer 50 or its agents 66 are able to respond to customer needs to maximize customer retention, recovery, and/or brand loyalty/engagement opportunities.

Embodiments of the invention are integrated with the CRM tool 68 such that the manufacturer 50 or its agents 66 are able to issue an individualized promotional offer as needed (e.g., on demand) to a consumer for redemption at certain locations or anywhere the manufacturer's products are sold. The individualized promotional offers may be communicated via email, text message, within an app operating on a customer's mobile device, or using any other form of direct communication, whether within a manufacturer platform or not. The promotional offers may be applied to customer recovery (e.g., in the case where a customer's product or product purchase experience was a bad one) or to brand-direct customer loyalty or customer engagement opportunities (e.g., as birthday wishes). The promotional offers issued to the customers using the CRM tool 68 and/or the CRM provider 64 utilize features of the various promotional offer embodiments discussed herein.

Accordingly, to facilitate issuance, use, and management of promotional offers in a customer relationship management environment such as that illustrated in FIG. 6, the manufacturer or promoter 50 establishes or maintains a communicative connection with the CRM provider 64. The communicative connection may be intermittent or on demand (e.g. upon initiation of the CRM tool 68 by one of the manufacturer's agents 66), or may be substantially continuous. When the agent 66 wishes to issue an individualized promotional offer as part of a customer relationship management effort, the agent 66 operates an interface within the CRM tool to indicate the desire to issue the individualized promotional offer. The promotional offer is then issued with a one-time-use bank card number and associated value, that is then encrypted to create the ciphertext promotional offer code, and the individualized promotional offer (the ciphertext promotional offer code) can then be transmitted to the customer (e.g., to the consumer computation device 56) using any desired communication method. The consumer is then able to utilize the promotional offer according to the principles previously discussed, with whatever limits (if any) have been imposed by the manufacturer (location, items (e.g., SKUs, GTINs, UPCs, ARNs, APNs, or the like), etc.). Additionally, the redemption process may utilize any process discussed herein, including direct application of promotional offer amounts to the purchase price or by triggering of loyalty rewards to the consumer's account.

Embodiments of the invention provide individualized promotional offers that allow for ubiquitous acceptance, CRM integration, and real-time traceability and frictionless direct-to-consumer targeting. Significantly greater flexibility of offer issuance and redemption is provided, and the manufacturer 50 is able to immediately discern as offers are redeemed so as to see the effect of customer relationship management efforts. Additionally, as discussed previously, embodiments of the invention allow CRM-integrated promotional offers to be item-specific and/or merchant-specific, as desired.

Various embodiments of the invention utilize a variety of methods to facilitate issuance of individualized promotional offers. In some embodiments, individualized promotional offers may be defined by the promoter or manufacturer 50 on demand. In such embodiments, the agent 66 utilizes an aspect of the CRM tool 68 (e.g., a drop-down menu, one or more fillable form fields, and the like) to define characteristics of the promotional offer to be issued. Such characteristics may include characteristics such as a recipient of the promotional offer, an amount of the promotional offer, one or more acceptable retailers or other locations where redemption of the promotional offer is acceptable, and/or one or more items (e.g., SKUs, GTINs, UPCs, ARNs, APNs, or the like) for which redemption of the promotional offer is authorized. The information provided by the agent 55 is received by the CRM tool 68 and is formatted into a request for issuance of a promotional offer.

The request for issuance of the promotional offer is then transmitted to the promotions provider 52. In one embodiment, the request for issuance of the promotional offer is transmitted to the promotions provider 52 using a communicative link established between the promoter or manufacturer 50 and the promotions provider 52. In another embodiment, the request for issuance of the promotional offer is transmitted to the promotions provider 52 using a communicative link between the CRM provider 64 and the promotions provider 52. The promotions provider 52 uses the information in the request for issuance of the promotional offer to create a corresponding individualized promotional offer including a one-time-use bank card number (which, in some embodiments, is a gift card number) and an assigned value equal to the promotional offer amount. As with other promotional offer embodiments discussed previously, the information associated with the individualized promotional offer is stored by the promotions provider 52 (e.g., using the blockchain) and can be used for promotional offer redemption and tracking. The individualized promotional offer is then transmitted back to the promoter or manufacturer 50 (e.g., using a similar communicative link or link to that or those used for transmission of the request for issuance of the promotional offer. Alternatively, in some embodiments, the promotions provider 52 transmits the individualized promotional offer directly to the consumer (e.g., to the consumer computing device 56), and sends a notice of such to the promoter or manufacturer 52.

In alternate embodiments, the characteristics of potential promotional offers are determined in advance. In such embodiments, representatives of the promoter or manufacturer 50 determine what promotional offers will be available to their CRM agents 66, including characteristics such as promotional offer value, redemption location restrictions, item restrictions (e.g., SKUs, GTINs, UPCs, ARNs, APNs, or the like), and the like, and a list of available potential promotional offers is generated. The list of available promotional offers may be generated by any participant in the process or by way of collaboration between entities in the process (e.g., by the CRM provider 64, the promoter or manufacturer 50, and/or the promotions provider 52). In such an embodiment, the actions of the agent 66 in issuing a promotional offer as part of a CRM effort may be reduced in number. By way of example, in such embodiments, the agent 66 merely selects among the available promotional offers and takes an action indicative of the customer to receive the selected offer.

In some such embodiments, the process then proceeds as described previously: a request for issuance of a promotional offer is generated and transmitted to the promotions provider 52, the promotions provider 52 creates the individualized promotional offer (the ciphertext promotional offer code) accordingly, and transmits it to the intended destination. The agent 66 of the promoter or manufacturer 50 is not free to define any promotional offer wished, however, but instead selects from among available promotional offers, and once a selection is made, an individualized promotional offer is created at the promotions provider 52 and issued as previously discussed.

In other embodiments, a number of the individualized promotional offers may be created in advance (in accordance with the list of available promotional offers) and stored to be ready for issuance on demand. In some embodiments, the individualized promotional offers are stored by the promotions provider 52 and are only transmitted to the promoter or manufacturer 50 (or to the consumer) on each individual request for issuance. In other embodiments, the individualized promotional offers are issued by the promotions provider 52 then stored by the CRM provider 64 and are selected and transmitted on to the promoter or manufacturer 50 or to the consumer by the CRM provider 64 with each individual request for issuance by the promoter or manufacturer 50. In such embodiments, the CRM provider 64 notifies the promotions provider 52 about issuance of each individualized promotional offer for tracking purposes as previously discussed, either in real time or on a defined schedule (e.g., in batches).

In still other embodiments, the individualized promotional offers are stored by the promoter or manufacturer 50 after issuance by the promotions provider 52. As the agent 66 of the promoter or manufacturer 50 selects individualized promotional offers for transmission to consumers, records are kept (either by the promoter or manufacture 50 or by the CRM provider 64) and are then transferred on to the promotions provider 52 either in real time or on a defined schedule (e.g., in batches).

Regardless, embodiments of the invention provide promoters and/or manufactures 50 with enhanced tracking of selection, issuance, and redemption of individualized promotional offers. Such enhanced tracking provides increased accountability and protection against fraud on the issuance side (e.g., with respect to the performance and action of the manufacturer's agents 66), as well as on the redemption side. Such tracking not only reduces the possibility of fraud or enables its detection, but also allows all entities involved in the promotions process to evaluate in real time the effects of customer relationship management efforts associated with the promotional offers.

Embodiments of the invention related to customer relationship management are adapted to utilize both direct-funded promotional offers (where the consumer can use the one-time-use bank card number decrypted from the ciphertext promotional offer code as a form of payment) and decline program promotional offers (where use of the promotional offer (one-time-use bank card number decrypted from the ciphertext promotional offer code) does not result in a reduced price at the POS, but instead results in accrual of a balance to a customer loyalty program). In the case of direct-funded individualized promotional offers, some embodiments of the invention allow for unlimited use or applicability of bank card balances (e.g., gift cards, etc.) at any location where such cards are accepted, while other embodiments of the invention allow placing of certain limits on use of the promotional offers, up to and including limitations on the items for which redemption of the individualized promotional offers is authorized. In the case of decline program individualized promotional offers, the collaboration between the retailer POS device 58 or system and the promotions provider 52 also allows for a wide variety of limits or restrictions to be selectively employed as may be desired for each applicable individualized promotion.

As individualized promotional offers are redeemed, whether through a direct-funded redemption of the bank card number as a discount on the POS price or through a redemption of a decline program promotional offer that triggers an increase in a balance of a loyalty program, the promotions provider 52 receives notification of redemption as previously discussed. The promotions provider 52 accordingly is able to notify either or both of the CRM provider 64 and the promoter or manufacturer 50 either in real time or on a defined schedule such that the CRM provider 64 and/or the promoter or manufacturer 50 is able to better track the results of the customer relationship management efforts and to adjust such efforts accordingly (e.g., by increasing or decreasing individualized promotional offer amounts, by training agents 66 to modify how and when individualized promotional offers are issued, etc.).

Funds associated with redemption of the coupons or other promotional offers can then be allocated as necessary on an ongoing basis. In some embodiments, settlement of necessary funds can occur each day at the end of the day. In other embodiments, settlement of funds occurs less frequently, such as every three to five days or weekly. In other embodiments, settlement of funds can occur in real time. In general, settlement of funds may occur on a time schedule that greatly increases the rapidity with which retailers receive their money, taking into account factors such as money transfer costs associated with many small transfers (e.g., some accumulation may occur to minimize transfer fees). Thus, as may be appreciated, settlement of funds may occur on any desired schedule, taking into account ensuring relatively rapid settlement of funds while avoiding unnecessary transfers of small amounts of money repeatedly. In other words, in some embodiments, settlement of funds may occur no later than the earlier of after a certain amount of time has passed or after a minimum settlement amount is owed to a particular retailer or other person or entity associated with redemption of the coupon or other promotional offer.

In some embodiments, settlement occurs with payment to the retailer or other business or individual at which the coupon or other promotional offer was redeemed. In other embodiments, settlement occurs with payment to an account of the consumer that redeemed the coupon or other promotional offer. Each of these involves a slightly different mechanism or process associated with the bank card number of the coupon.

In some embodiments, when the ciphertext promotional offer code is issued to the consumer, a fund amount associated with the coupon or promotional offer is associated with the bank card number. In effect, the consumer receives ciphertext promotional offer code (equivalent to a gift card) with a monetary value equal to the coupon or promotional offer value (e.g., three dollars, ten euros, etc.), as long as the consumer uses the ciphertext promotional offer code to attempt to purchase an allowed item. In such embodiments, the ciphertext promotional offer code can be used like any traditional credit or gift card as partial payment for the goods or services associated with the promotional offer or coupon, except that unlike previous credit or gift cards, use of the ciphertext promotional offer code is limited to authorized purchases. In such embodiments, accordingly, the retailer receives the ciphertext promotional offer code at the POS device 58, decrypts the bank card number at the POS device 58 if and only if an authorized item is part of the purchase, and an authorization request is sent to the bank card processor 54 in the amount of the face value of the coupon or other promotional offer. When the authorization is approved through both parts of the authorization process (both decrypting a valid bank card number and then the card number being approved through the bank card processor), the discount is reflected in the total bill to the consumer at the POS device 58, and the remaining balance can be paid by the consumer using traditional methods. In this case, funds for the amount of the discount are transferred to the retailer associated with the POS.

In other embodiments, when the bank card number is issued to the consumer, no funds are directly associated with the coupon or promotional offer. When the bank card number is received at the POS device 58, the new authorization transaction with the bank card processor 54 is a zero-value authorization transaction, a zero-ping code, or the like. As this authorization is not a traditional authorization requiring the transfer of actual money to the retailer with guarantees by the bank card processor 54, the bank card processor 54 may optionally charge less for processing this authorization transaction, thereby reducing the cost of processing for the promotional campaign. The promotions provider 52 is still notified of the transaction and is still able to determine whether the transaction relates to an issued and unused coupon or other promotional offer, and can still record the transaction (e.g., on the blockchain), but no money is transferred to the retailer. Instead, at most, an "authorized" transmission is returned to the POS device 58, and the consumer still pays full price at the POS. Nevertheless, because a second authorization process occurs, the system is still able to verify and ensure that the promotional offer was used for its intended purpose. Then, when it comes time to settle the coupon or promotional offer value, the value is returned directly to the consumer, typically by crediting a consumer account associated with the consumer and/or an app operating on the consumer computing device 56.

Another advantage of either process is that the retailer need not manually or otherwise program coupons and promotional offers into its systems. Instead, if the bank card is associated with a value, redemption of the card can occur by way of a traditional card authorization, with the bank card processor 54 returning an authorization communication that includes the amount of the partial payment received from the bank card. Similarly, if the bank card is not associated with a value, redemption of the card occurs by way of a zero-value authorization, and the consumer still pays full value at the POS. The consumer then is reimbursed or receives associated funds directly without merchant involvement. Accordingly, the burden on retailers and other merchants accepting coupons and promotional offers is greatly reduced for both the settlement process as well as the process of being able to accept coupons and promotional offers.

Figure 4:
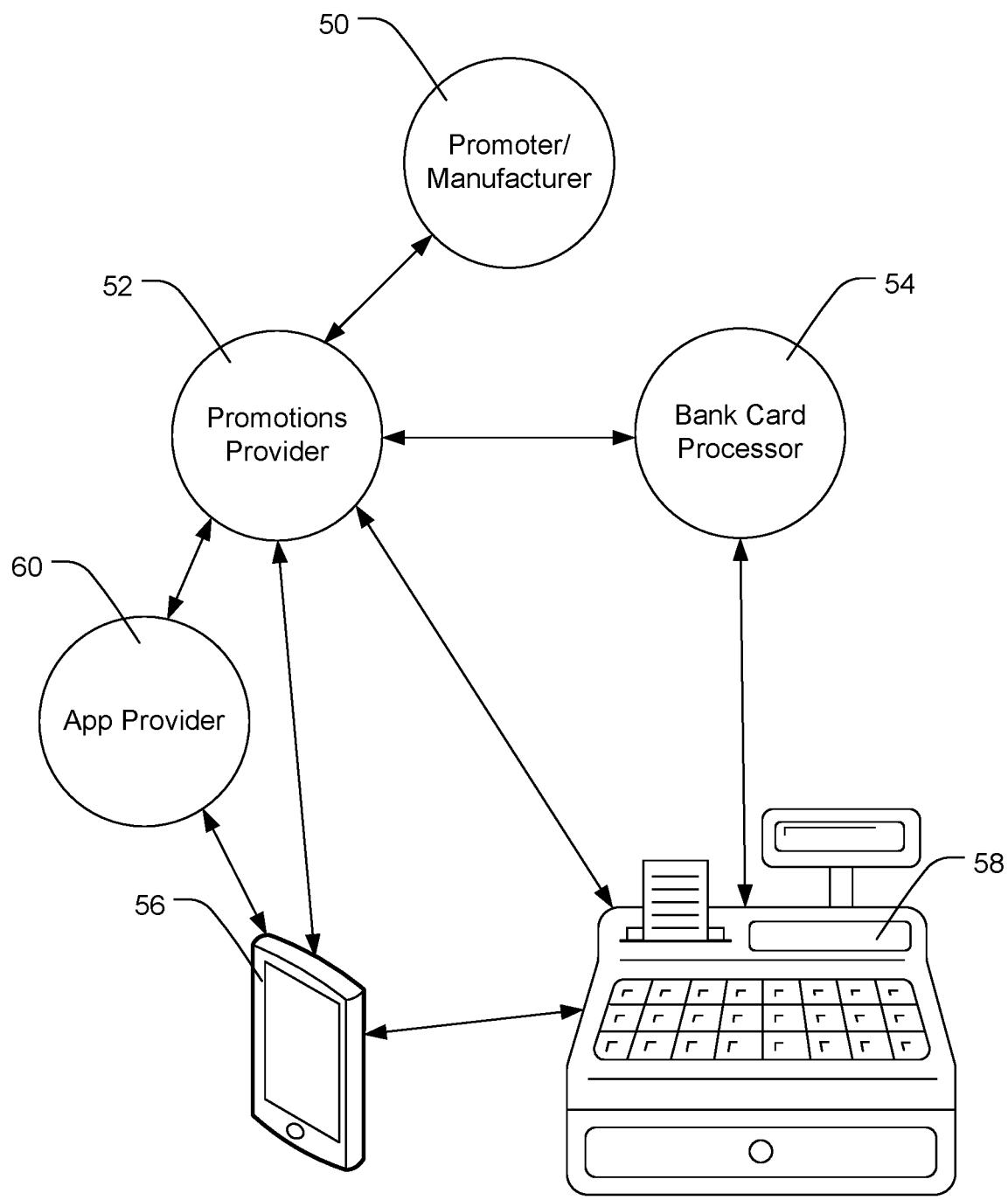
FIG. 4 shows another example of a representative environment in which embodiments of the invention may be implemented.

An example of a zero-value authorization environment is illustrated with respect to FIG. 4. This environment is largely similar to the environment of FIG. 3, with the addition of an app provider 60 that provides an app to the consumer computing device 56. In some embodiments, the app provider 60 and the promoter 50 are the same business entity or are divisions of the same business entity. In some embodiments, the app provider 60 and the promotions provider 52 are the same business entity or are divisions of the same business entity. The app provider 60 provides an app that operates on the consumer computing device 56. The app provider 60 may also deliver services to the consumer through the app operating on the consumer computing device 56. By way of example, an app operating on the consumer computing device 56 may provide gas price information to the consumer to facilitate comparison shopping, and may receive and the app provider 60 may deliver updated price information through the app. The consumer may own a consumer account associated with the app, whereby the consumer may receive additional services, discounts, and the like using the app, and may even be able to pay others for goods or services through the app.

In some embodiments, the coupon or other promotional offer is first presented to the consumer through the app provided by the app provider 60. The consumer is also able to accept the offer and receive the coupon or other promotional offer (the ciphertext promotional offer code) through the app. The consumer may also be able to present the coupon or other promotional offer at the POS using the app.

In this environment, when the bank card number is not associated with a value whereby the consumer can partially pay at the POS with the bank card number, the system can still provide an equivalent value to the consumer. When the consumer redeems the coupon or other promotional offer at the POS device 58 and decryption is successful (e.g., in some embodiments, an authorized product was purchased), the zero-value authorization transaction occurs, and in some embodiments the promotions provider 52 notifies the app provider 60 of the transaction and transfers appropriate funds to the app provider 60. The app provider 60 then credits an account of the consumer on the app with an amount equal to the coupon or other promotional offer. The consumer can then use the funds for goods or services through the app or using the app at other points of sale, if the app provides such functionality. In other embodiments, the app may allow the user to transfer funds from the app to the user's bank account or to other app users.

All this functionality is provided without requiring a direct funds authorization through the bank card processor 54. Instead, because the promotions provider 52 is aware that the coupon or other promotional offer was associated with the bank card number and was issued to the consumer as the ciphertext promotional offer code (e.g., upon request of the consumer or upon satisfaction of a geo-location requirement or other precondition), when the promotions provider 52 receives notification of the zero-value authorization request, the promotions provider 52 knows the coupon or other promotional offer was used and can then undertake settlement of the value of the offer through any desired process, including nontraditional mechanisms. This settlement process may be immediate or on any appropriate time schedule (e.g., daily, every few days, weekly, etc., as discussed previously).

As may be appreciated, embodiments of the invention utilize bank card numbers for each coupon or other promotional offer to generate the ciphertext promotional offer code. Accordingly, as illustrated in FIG. 5, certain embodiments of the invention are implemented in a system in which a bank card issuer 62 issues a number of bank card numbers for use in the promotional campaign. As may be appreciated, the obtaining of bank card numbers represents a cost to the promotional campaign. Additionally, the authorization fees charged by the bank card processor 54, whether as zero-value authorizations or authorizations of the face value of the coupon or other promotional offer, are also a cost of the promotional campaign. Accordingly, the promotions provider 52 typically passes such costs on to the promoter 50 when the promotional campaign is initiated. In some instances, lower per-coupon costs may be obtained by way of bulk purchases of bank card numbers and/or by negotiating bulk authorization rates with the bank card processor 54.

Because the use of legitimate bank card numbers in the process represents a cost to the promotional campaign, bank card numbers are typically only associated with coupons or other promotional offers at the time of issuance of a specific coupon or other promotional offer. In embodiments where the coupon or other promotional offer is associated with locational proximity to the location where the coupon or other promotional offer will be used, there is a high likelihood that the coupon or other promotional offer will be redeemed. Nevertheless, a certain amount of non-redeemed offers is to be expected, again representing a cost of the promotional campaign. Nevertheless, embodiments of the invention represent a significant improvement over current coupon promotional campaigns where often a vast number of coupons go unused.

Embodiments of the invention also represent a significant improvement in promoters', issuers', and manufacturers' abilities to monitor and control their promotional campaigns. The item-specific decryption and authorization process, in particular, represents a significant improvement in promoters', issuers', and manufacturers' abilities to monitor and control their promotional campaigns. Because coupons and promotional offers can be offered directly to interested consumers and consumers that are in geographic proximity to locations of use, the redemption rate for coupons and other promotional offers is relatively high. Accordingly, fewer overall coupons and promotional offers need be issued, and issuance of coupons and promotional offers can stop at any time, thereby limiting outflow of money relative to the promotional campaign. The promoter 50, issuer, and/or manufacturer will not find itself in a position of underestimating the appeal and/or redemption rate of coupons or promotional offers, such that promoters 50 need not be concerned that promotional campaigns will greatly exceed their allocated budgets.

The promotions provider 52 is also able to provide various reports to the promoter 50 to keep the promoter 50 informed of the status of the promotional campaign. Reports may be provided on a scheduled basis, or the promoter 50 is in some embodiments enabled to access reports on demand to view real-time status of the promotional campaign. The promoter 50 and the promotions provider 52 are thus informed and able to take action if necessary to discontinue or modify the promotional campaign.

Because of the tools and real-time control provided to the promoter 50 by embodiments of the invention, the promoter 50 is able to exercise control over the promotional campaign in ways so as to better achieve campaign goals. By way of example, the promoter 50 may wish, and may have arranged with the promotions provider 52, a promotional campaign that will result in a certain number of promotional redemptions in a certain amount of time. As a specific example, the promoter 50 may intend for a promotion to run for two weeks and may allocate $1 million dollars initially intended to be distributed as 200,000 $5 dollar promotional offers. As the promotional campaign progresses, the promoter 50 may access reports provided by the promotions provider 52 at any time, and may determine that either fewer or more promotional offers are being accepted and redeemed than expected.

If fewer promotional offers are being accepted and redeemed than expected, the promoter 50, possibly consulting with the promotions provider 52, may determine to modify the manner in which the promotions are being offered to consumers or may elect to make the terms of the promotional offer more enticing. As a specific example, if a week of the two-week promotional period has passed and only 10,000 (of the 200,000 anticipated) promotional offers have been accepted, let alone redeemed, the promoter 50 may elect to increase the rate at which or manners by which promotional offers are displayed to consumers for acceptance. Alternately or additionally, the promoter 50 may elect to increase the number of products to which the promotional offer applies. Still alternatively or additionally, the promoter 50 may elect to increase the value of the promotional offer to $6 dollars or some other increased value over the original $5 dollar offering. Any appropriate action may be taken to modify the promotional campaign to achieve campaign goals.

Similarly, if more promotional offers are being accepted and redeemed than initially expected, the promoter 50 may elect to take an action to modify the promotional campaign appropriately. As one example, the promoter 50 may elect to dedicate more funds to the promotional campaign to permit more promotional offers to be extended. Alternatively, the promoter 50 may elect to modify future offered promotions to apply to fewer goods or services, or may even reduce the value of yet-unaccepted or yet-offered promotions to make promotional campaign funds last longer. Such actions can be taken at any time in real time, and can be applied to all offered promotions moving forward.

In some limited circumstances (typically to the benefit of consumers), changes to promotional offers may be made even after acceptance by the consumer but before redemption. For example, a promotion accepted by the consumer may be increased in value after acceptance to encourage redemption. In some embodiments, for example where the promotional offer is provided through an app on the consumer computing device 56, the consumer may be reminded of accepted, but unredeemed, offers from time to time, such as upon a return of the consumer to a local where the promotional offer may be redeemed. Such reminder may include a notification that a value of the promotional offer has increased if such has occurred.

Reminders of accepted promotional offers may serve as another control by which the promoter 50 or promotions provider 52 may seek to modify a redemption rate associated with the promotional campaign. If, for example, an initial reminder rate fails to result in an anticipated or desired level of redemption of promotional offers, the promotions provider 52 may provide an opportunity for the promoter 50 to elect to increase the number of reminders provided to consumers who accepted the promotion. Accordingly, embodiments of the invention provide significant advantages to promoters 50 and to promotional campaigns in the manner in which campaigns can be controlled in real time.

Embodiments of the invention greatly protect against fraudulent activity, essentially eliminating the opportunity for fraud. Additionally, embodiments of the invention greatly improve the settlement process, whereby the recipients of coupons on redemption no longer need participate in a time-consuming manual or pseudo-manual process to receive reimbursement for received coupons. Instead, the prior months-long settlement process is reduced to as little as a day or a few days. In some embodiments, settlement can occur at the time of each transaction (e.g., in real time), essentially eliminating all settlement delay. Because fraud is eliminated using embodiments of the invention, settlement occurs at full coupon value, greatly benefiting honest retailers who often received only 80% or less of coupon value using traditional methods.

The promotions provider 52 maintains a full transaction log of all transactions from creation of the promotional campaign through settlement, including serialization of the coupons or other promotional offers, assigning of the bank card numbers on issuance of the coupons or other promotional offers, generation of the ciphertext promotional offer codes, redemption thereof, and settlement for redeemed offers. In some embodiments, this information is maintained on the blockchain to prevent data tampering. Accordingly, the promotions provider 52 and the promoter 50 are fully able to audit the promotional campaign and verify return on investment at any point in the process, representing a significant improvement over prior methods.

Additionally, methods in accordance with embodiments of the invention provide significantly more information to promoters 50 about the effectiveness of their promotional campaigns. Embodiments of the invention allow the promotions provider 52 to track far more information than merely the number of redeemed offers at the end of a promotional campaign. Instead, the promotions provider 52 can track the rate at which offers are accepted by consumers compared to the rate offers were shown to consumers. The promotions provider 52 can also track the rate at which offers are redeemed as opposed to the rate at which offers were accepted by consumers. The promotions provider 52 can also track down to item-specific redemptions, including where promotional offers applied to more than one item. Furthermore, more granular data can be obtained, such as by way of comparison of offer acceptance and redemption rates in certain locations, with certain timing, and the like. Promoters 50, issuers, and manufacturers can accordingly be much better informed as to the effectiveness of their promotional campaigns.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for point-of-sale-based item-specific redemption of a promotional offer comprising:
    providing a point-of-sale device comprising one or more input mechanisms adapted to receive:
        information identifying one or more items being purchased in a purchase transaction; and
        a ciphertext promotional offer code as at least partial payment for the purchase transaction;
    receiving, using one of the one or more input mechanisms of the point-of-sale device, the information identifying the one or more items being purchased in the purchase transaction;
    receiving, using one of the one or more input mechanisms of the point-of-sale device, the ciphertext promotional offer code as at least partial payment for the purchase transaction;

utilizing a processor operatively connected to the point-of-sale device to operate a decryption algorithm that receives as inputs:
- the ciphertext promotional offer code; and
- the information identifying the one or more items being purchased in the purchase transaction;

whereby if and only if one piece of the information identifying the one or more items being purchased identifies a product for which use of the ciphertext promotional offer is authorized, when the ciphertext promotional offer code and the piece of the information identifying the product for which use of the ciphertext promotional offer is authorized are provided to the decryption algorithm as inputs, the decryption algorithm outputs a valid one-time-use unique bank card number as an output to the point-of-sale device.

2. The method as recited in claim 1, wherein the one or more input mechanisms comprise one or more mechanisms selected from the group consisting of:
- a keyboard;
- a touchscreen;
- an optical scanner;
- a microphone;
- a camera; and
- a wireless communication device.

3. The method as recited in claim 1, wherein the input mechanism used for receiving the information identifying the one or more items being purchased and the input mechanism used for receiving the ciphertext promotional offer code are the same.

4. The method as recited in claim 1, wherein the ciphertext promotional offer code comprises information selected from the group consisting of:
- a string of alphanumerical digits;
- a one-dimensional barcode;
- a two-dimensional barcode;
- a computer-readable code storable on a non-transitory computer-readable medium;
- a quick response (QR) code;
- a pulsed-light code; and
- an auditory code.

5. The method as recited in claim 1, wherein the piece of information identifying the product for which use of the ciphertext promotional offer is authorized is selected from the group consisting of:
- a stock keeping unit (SKU);
- a global trade item number (GTIN);
- a universal product code (UPC);
- an international article number (ARN); and
- an Australian product number (APN).

6. The method as recited in claim 1, wherein the point-of-sale device is configured to:
attempt to decrypt the ciphertext promotional offer code using the decryption algorithm and the information identifying the one or more items being purchased, comprising:
- for each item of the one or more items being purchased and until the earlier of decryption of the valid one-time-use unique bank card number and when all of the information identifying the one or more items being purchased has been tried using the decryption algorithm, providing the ciphertext promotional offer code and information identifying one of the one or more items being purchased as inputs to the decryption algorithm; and
- determining whether any output of the decryption algorithm is the valid one-time-use unique bank card number.

7. The method as recited in claim 6, wherein the step of determining whether any output of the decryption algorithm is the valid one-time-use unique bank card number comprises a process selected from the group consisting of:
- for each output of the decryption algorithm, determining whether such output begins with a valid bank identification number (BIN) accepted by a merchant operating the point-of-sale device;
- for each output of the decryption algorithm, determining whether such output operates as a valid bank card number in a bank card processing system; and
- for each output of the decryption algorithm, determining whether such output operates as a valid bank card number according to a checksum performed using the Luhn algorithm.

8. The method as recited in claim 7, wherein the point-of-sale device is configured to attempt to process through a bank card processing system at least partial payment for any output of the decryption algorithm that is determined to operate as a valid bank card number.

9. The method as recited in claim 6, wherein the point-of-sale device is configured to attempt to decrypt the ciphertext promotional offer code using the decryption algorithm and the information identifying the one or more items being purchased using a method selected from the group consisting of:
- serial processing of the information identifying each of the one or more items being purchased; and
- parallel processing of the information identifying at least two of the one or more items being purchased.

10. The method as recited in claim 6, wherein the point-of-sale device is configured to utilize a bank card authorization process to attempt to authorize the one-time-use unique bank card number as at least partial payment for the one or more items being purchased.

* * * * *